United States Patent
Lee et al.

(10) Patent No.: US 10,628,024 B2
(45) Date of Patent: Apr. 21, 2020

(54) METHOD FOR SETTING GUIDELINES FOR AN OMNIDIRECTIONAL IMAGE BASED ON USER GESTURES ON A TOUCH SCREEN

(71) Applicant: LG ELECTRONICS INC., Seoul (KR)

(72) Inventors: Jisun Lee, Seoul (KR); Suyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 236 days.

(21) Appl. No.: 15/655,365

(22) Filed: Jul. 20, 2017

(65) Prior Publication Data
US 2018/0052576 A1 Feb. 22, 2018

(30) Foreign Application Priority Data
Aug. 18, 2016 (KR) .................... 10-2016-0104962

(51) Int. Cl.
| | |
|---|---|
| *H03M 11/00* | (2006.01) |
| *H01H 13/70* | (2006.01) |
| *H03K 17/94* | (2006.01) |
| *H04N 1/00* | (2006.01) |
| *G06F 3/0485* | (2013.01) |
| *G06F 3/0481* | (2013.01) |
| *G06F 3/0488* | (2013.01) |
| *G06F 3/16* | (2006.01) |
| *G06F 3/0484* | (2013.01) |
| *G06F 3/0486* | (2013.01) |
| *G06F 3/0487* | (2013.01) |

(52) U.S. Cl.
CPC ........ *G06F 3/0485* (2013.01); *G06F 3/04815* (2013.01); *G06F 3/04883* (2013.01); *G06F 3/167* (2013.01); *G06F 3/0484* (2013.01); *G06F 3/0486* (2013.01); *G06F 3/0487* (2013.01); *G06F 3/04842* (2013.01); *G06F 3/04845* (2013.01); *G06F 3/04847* (2013.01)

(58) Field of Classification Search
CPC .............. G06F 3/0485; G06F 3/04815; G06F 3/04883; G06F 3/167
USPC ........................................................ 715/786
See application file for complete search history.

(56) References Cited

U.S. PATENT DOCUMENTS

| | | | |
|---|---|---|---|
| 6,795,113 B1 | 9/2004 | Jackson et al. | |
| 2008/0256484 A1* | 10/2008 | Kraft ................... | G06F 3/04812 715/799 |

(Continued)

*Primary Examiner* — Cesar B Paula
*Assistant Examiner* — Luu-Phuong T Nguyen
(74) *Attorney, Agent, or Firm* — Birch, Stewart, Kolasch & Birch, LLP

(57) ABSTRACT

A mobile terminal including a wireless communication processor configured to provide wireless communication; a touch screen; and a controller configured to display an area of an omnidirectional image on the touch screen, display a guideline on the touch screen for guiding a movement of the omnidirectional image on the touch screen, in response to a scrolling gesture on the touch screen having a first direction corresponding to a direction of the guideline, move the display area of the omnidirectional image in the first direction, and in response to the scrolling gesture on the touch screen having a second direction different than the direction of the guideline, move the display area of the omnidirectional image along the guideline in the first direction instead of the second direction.

17 Claims, 44 Drawing Sheets

(56) References Cited

U.S. PATENT DOCUMENTS

| | | | |
|---|---|---|---|
| 2009/0058806 A1* | 3/2009 | Middler | G06F 3/023 |
| | | | 345/157 |
| 2009/0058830 A1 | 3/2009 | Herz et al. | |
| 2009/0265627 A1* | 10/2009 | Kim | G06F 1/1626 |
| | | | 715/702 |
| 2012/0056836 A1* | 3/2012 | Cha | G06F 3/04842 |
| | | | 345/173 |
| 2012/0133680 A1 | 5/2012 | Hoover et al. | |
| 2013/0154930 A1 | 6/2013 | Xiang et al. | |
| 2014/0035946 A1* | 2/2014 | Chang | G06F 3/017 |
| | | | 345/619 |
| 2014/0085412 A1 | 3/2014 | Hayashi | |
| 2015/0040073 A1 | 2/2015 | Barcay et al. | |
| 2015/0082230 A1* | 3/2015 | Lee | G06F 3/04817 |
| | | | 715/773 |
| 2015/0195789 A1* | 7/2015 | Yoon | G06F 3/0488 |
| | | | 345/173 |
| 2015/0234529 A1* | 8/2015 | Kim | G06F 3/0416 |
| | | | 345/173 |
| 2016/0110056 A1* | 4/2016 | Hong | G06F 3/04812 |
| | | | 715/768 |
| 2016/0132189 A1* | 5/2016 | Choi | G06T 19/006 |
| | | | 345/633 |
| 2016/0313909 A1* | 10/2016 | Choy | G06F 3/04883 |
| 2017/0220226 A1* | 8/2017 | Wu | G06F 3/04817 |

\* cited by examiner

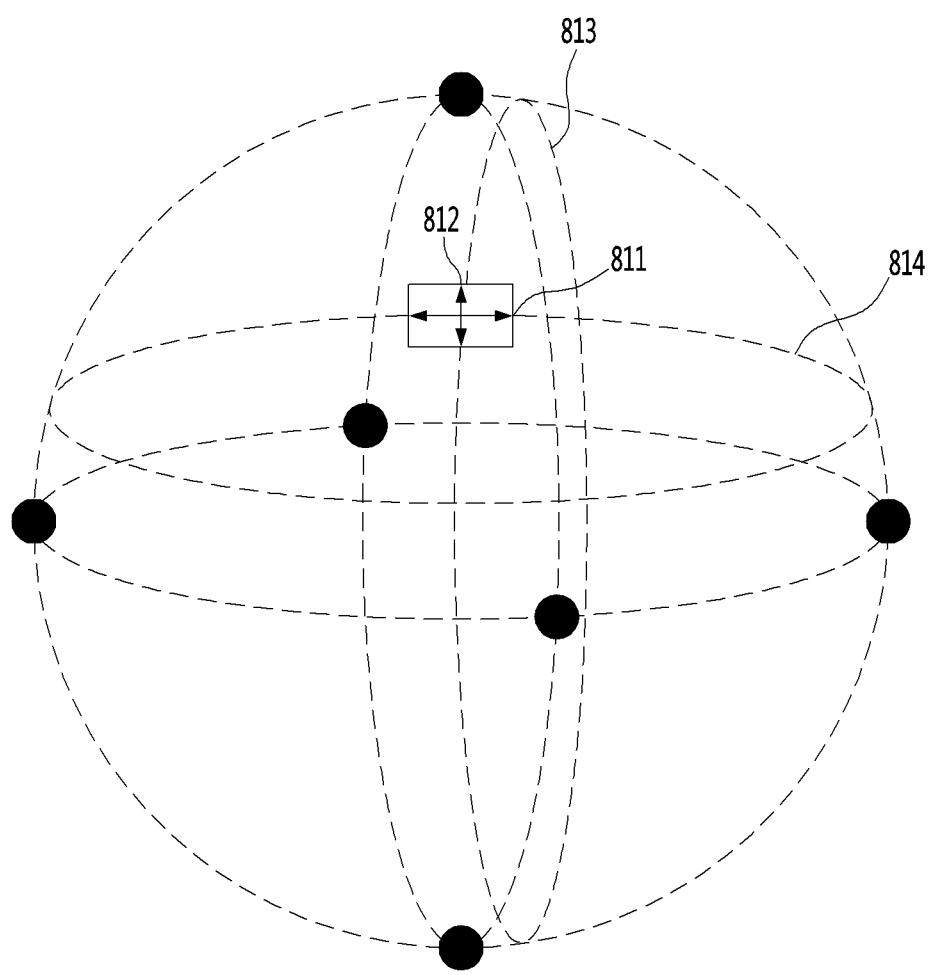

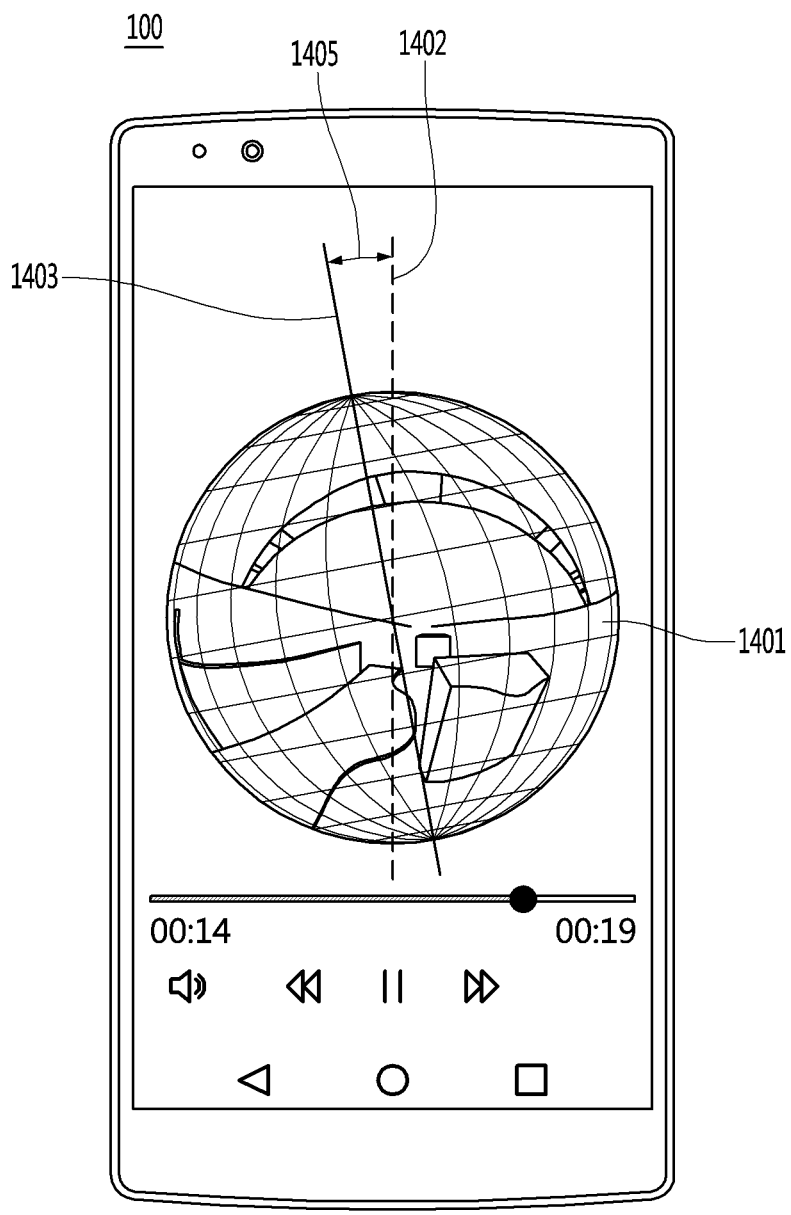

METHOD FOR SETTING GUIDELINES FOR AN OMNIDIRECTIONAL IMAGE BASED ON USER GESTURES ON A TOUCH SCREEN

CROSS-REFERENCE TO RELATED APPLICATIONS

This application claims priority to Korean Patent Application No. 10-2016-0104962 filed in Republic of Korea on Aug. 18, 2016, the entire contents of which are hereby incorporated by reference in their entirety.

BACKGROUND

Field

The present disclosure relates to a mobile terminal, and more particularly, to a mobile terminal capable of controlling a screen along a guideline when a user views an omnidirectional image.

Discussion of Background

Terminals can be generally classified as mobile/portable terminals or stationary terminals. Mobile terminals can also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal can be embodied in the form of a multimedia player or device.

In addition, an image including all areas around a camera capable of photographing an omnidirectional (360 degrees) image can be photographed using the camera. Such an omnidirectional image can be reproduced by a monitor, a VR device, a mobile terminal, and the like.

However, when an omnidirectional image is reproduced using a mobile terminal, there is a limit in smoothly reproducing the omnidirectional image due to the limitation of the size of a display unit in the mobile terminal. In addition, a user has difficulty in scrolling an omnidirectional image in a desired direction due to the characteristic that the omnidirectional image can be scrolled in all directions.

For example, although the user intends to move an omnidirectional image in the horizontal direction, the user has difficulty in accurately scrolling the omnidirectional image in a desired direction. That is, there is a limit in accurately moving an omnidirectional image in a direction desired by a user, using typical screen scrolling technologies.

SUMMARY

Accordingly, an object of the present disclosure is to address the above-noted and other problems.

Another object of the present disclosure is to provide a mobile terminal that enables a user to view a desired image by scrolling an omnidirectional image in a direction desired by the user while the user is viewing the omnidirectional image through the mobile terminal.

Another object of the present disclosure is to provide a mobile terminal that enables a user to conveniently generate control, or remove a guideline for moving an omnidirectional image in a desired direction while the user is viewing the omnidirectional image through the mobile terminal.

In one embodiment, there is provided a mobile terminal including: a display unit configured to display an omnidirectional image and include a touch sensor; and a controller configured to display a guideline and control movement of a display area in which the omnidirectional image is displayed on the display unit to correspond to a direction of the guideline, based on a first gesture of a user.

In another embodiment, there is provided a method for operating a mobile terminal, the method including: displaying an omnidirectional image; displaying a guideline; and controlling movement of a display area in which the omnidirectional image is displayed on the display unit to correspond to a direction of the guideline, based on a first gesture of a user.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIGS. 8A to 8D are views illustrating an example of automatically setting a guideline in an omnidirectional image according to an embodiment of the present disclosure;

FIGS. 14A to 14C are views illustrating an example of controlling an angle of an omnidirectional image according to an embodiment of the present disclosure.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein can be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings can also be applied to stationary terminals such as digital TV, desktop computers, and the like.

Figure 1A:
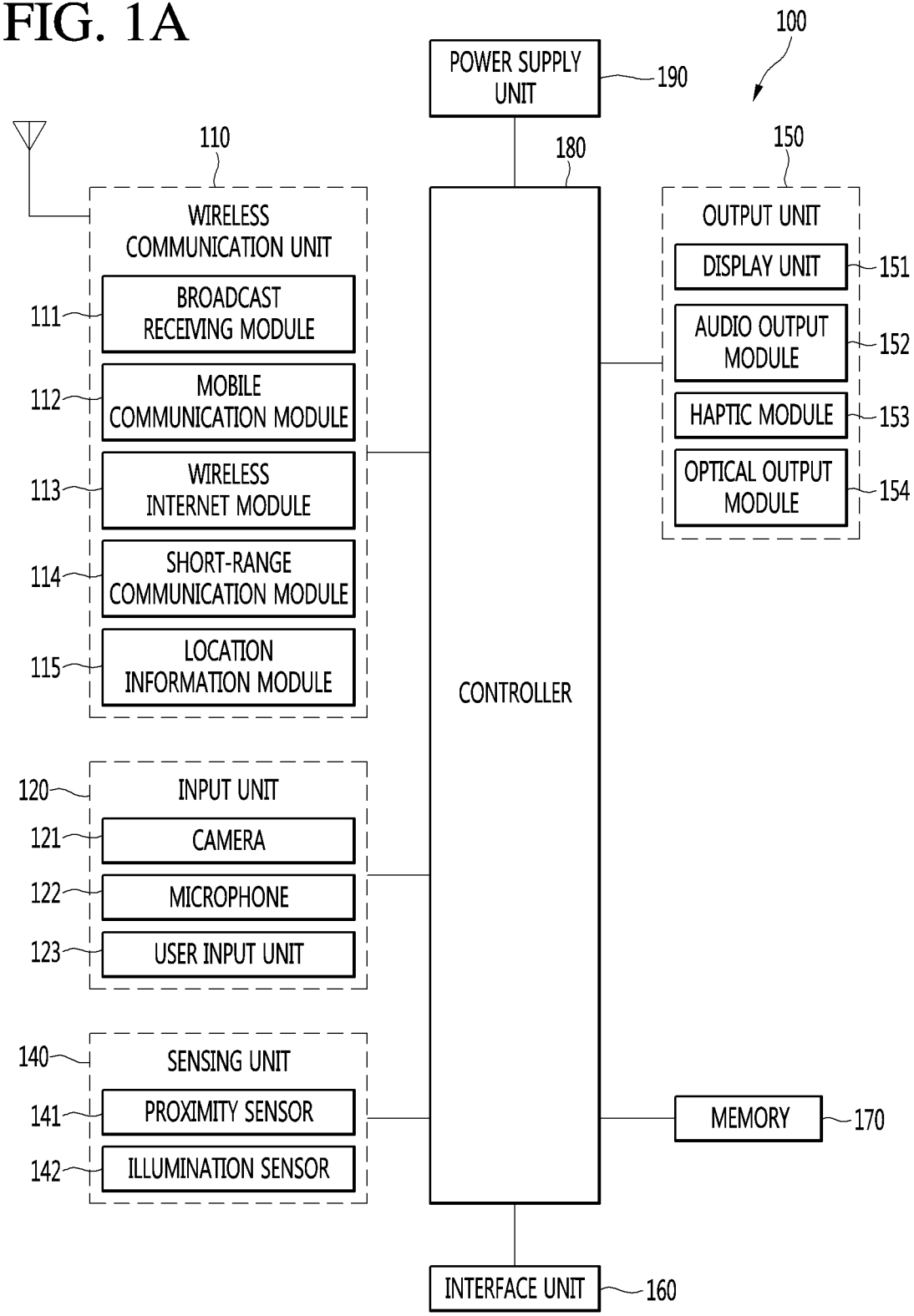
FIG. 1A is a block diagram of a mobile terminal according to an embodiment of the present disclosure.
Figure 1B:
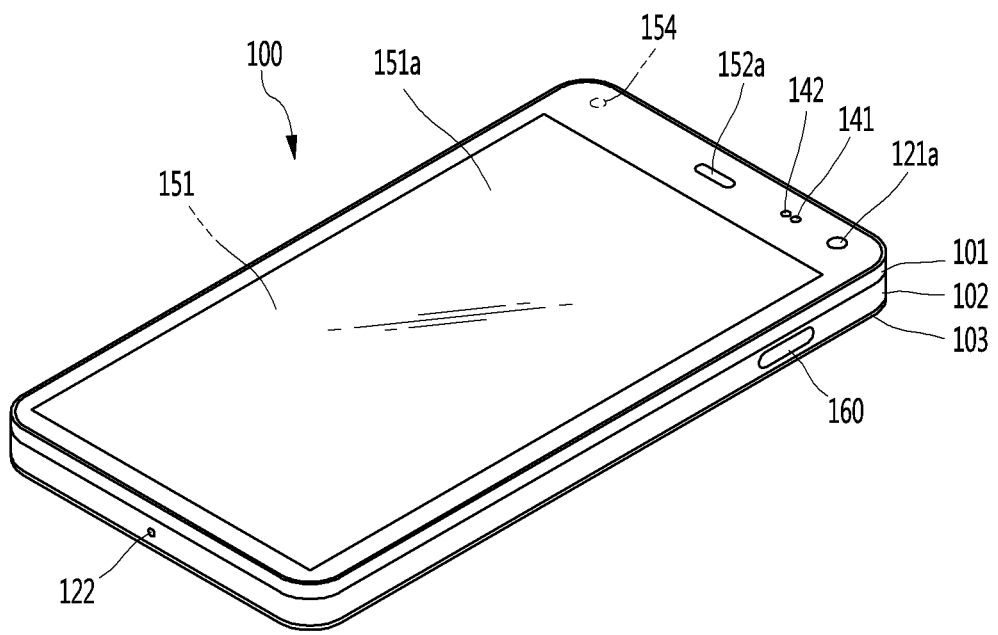
FIGS. 1B and 1C are conceptual views of one example of the mobile terminal, viewed from different directions.
Figure 1C:
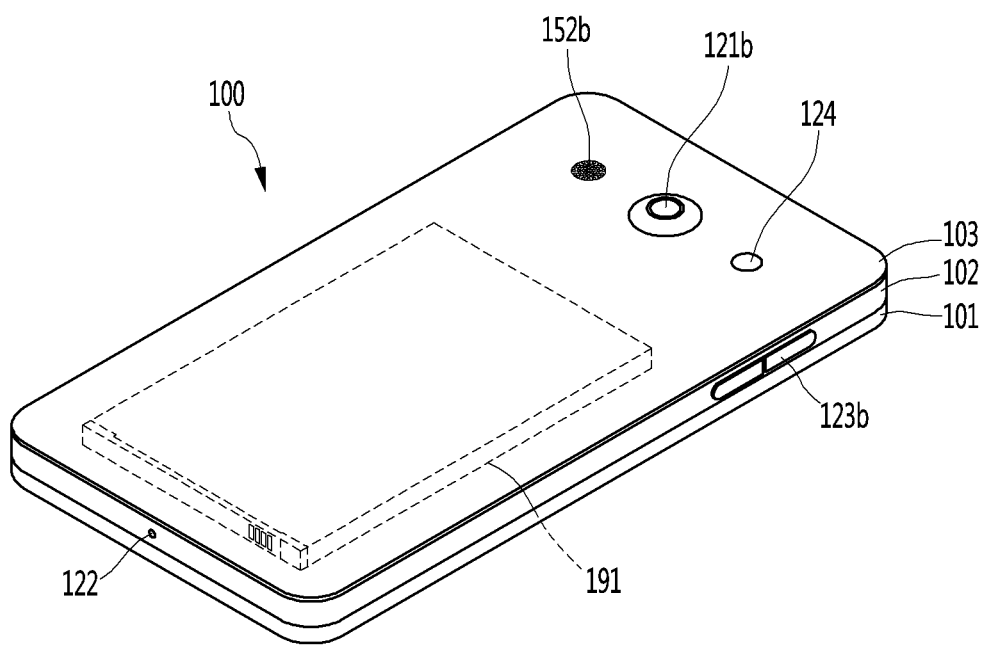

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components can alternatively be implemented. Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and can be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 can alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 can be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 can have an inter-layered structure or an integrated structure with a touch sensor in order to facilitate a touch screen. The touch screen can provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, can include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 can perform assorted control functions associated with a connected external device, in response to the external device being connected to the interface unit 160.

The memory 170 is typically implemented to store data to support various functions or features of the mobile terminal 100. For instance, the memory 170 can be configured to store application programs executed in the mobile terminal 100, data or instructions for operations of the mobile terminal 100, and the like. Some of these application programs can be downloaded from an external server via wireless communication. Other application programs can be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 can include a battery, and the battery can be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel can include a satellite channel, a terrestrial channel, or both. In some embodiments, two or more broadcast receiving modules 111 can be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal can be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information include information associated with a broadcast channel, a broadcast program, a broadcast event, a broadcast service provider, or the like. The broadcast associated information can also be provided via a mobile communication network, and in this instance, received by the mobile communication module 112.

The broadcast associated information can be implemented in various formats. For instance, broadcast associated information includes an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 can be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module can be internally or externally coupled to the mobile terminal 100. The wireless Internet module 113 can transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 can transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 can cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which can be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 can be configured to permit various types of input to the mobile terminal 120. Examples of such input include audio, image, video, data, and user input. Image and video input is often obtained using one or more cameras 121. Such cameras 121 can process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 can be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 can include assorted noise removing algorithms to remove unwanted noise generated in the course of receiving the external audio.

The user input unit 123 is a component that permits input by a user. Such user input can enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key can be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, can include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) can also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 can sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor can be configured to convert changes of pressure applied to a specific part of the display unit 151, or convert capacitance occurring at a specific part of the display unit 151, into electric input signals. The touch sensor can also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals can be transmitted to a touch controller. The touch controller can process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input can be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, can calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source can be calculated using this fact. For instance, the position of the wave generation source can be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor allows detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 can display execution screen information of an application program executing at the mobile terminal 100 or user interface (UI) and graphic user interface (GUI) information in response to the execution screen information.

In some embodiments, the display unit 151 can be implemented as a stereoscopic display unit for displaying stereoscopic images. A typical stereoscopic display unit can employ a stereoscopic display scheme such as a stereoscopic scheme (a glass scheme), an auto-stereoscopic scheme (glassless scheme), a projection scheme (holographic scheme), or the like.

In general, a 3D stereoscopic image includes a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" can be used to refer to a reduced image or a reduced still image. A generated left image thumbnail and right image thumbnail can be displayed with a horizontal distance difference there between by a depth corresponding to the disparity between the left image and the right image on the screen, thereby providing a stereoscopic space sense.

A left image and a right image required for implementing a 3D stereoscopic image can be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 can output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 can include message reception, call signal reception, a missed call, an alarm, a schedule notice, an email reception, information reception through an application, and the like.

A signal output by the optical output module 154 can be implemented so the mobile terminal emits monochromatic light or light with a plurality of colors. The signal output can be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 can store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 can also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 can include a connection port. The connection port can be configured as one example of the interface unit 160 to which an external charger for supplying power to recharge the battery is electrically connected.

As another example, the power supply unit 190 can be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case can be additionally positioned between the front case 101 and the rear case 102.

The display unit 151 is shown located on the front side of the terminal body to output information. As illustrated, a window 151*a* of the display unit 151 can be mounted to the front case 101 to form the front surface of the terminal body together with the front case 101.

In some embodiments, electronic components can also be mounted to the rear case 102. Examples of such electronic components include a detachable battery 191, an identification module, a memory card, and the like. Rear cover 103 is shown covering the electronic components, and this cover can be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 can also be completely shielded by the rear cover 103. In some embodiments, the rear cover 103 can include an opening for externally exposing a camera 121*b* or an audio output module 152*b*.

The cases 101, 102, 103 can be formed by injection-molding synthetic resin or can be formed of a metal, for example, stainless steel (STS), aluminum (Al), titanium (Ti), or the like. As an alternative to the example in which the plurality of cases form an inner space for accommodating components, the mobile terminal 100 can be configured such that one case forms the inner space. In this example, a mobile terminal 100 having a uni-body is formed so synthetic resin or metal extends from a side surface to a rear surface.

If desired, the mobile terminal 100 can include a waterproofing unit for preventing introduction of water into the terminal body. For example, the waterproofing unit can include a waterproofing member which is located between the window 151*a* and the front case 101, between the front case 101 and the rear case 102, or between the rear case 102 and the rear cover 103, to hermetically seal an inner space when those cases are coupled.

The mobile terminal includes a display unit 151, a first and a second audio output modules 151*a*/151*b*, a proximity sensor 141, an illumination sensor 142, an optical output module 154, a first and a second cameras 121*a*/121*b*, first and second manipulation units 123*a*/123*b*, a microphone 122, interface unit 160 and the like. The display unit 151, the first audio output module 151*a*, the proximity sensor 141, an illumination sensor 142, the optical output module 154, the first camera 121*a* and the first manipulation unit 123*a* are arranged in front surface of the terminal body, the second manipulation unit 123*b*, the microphone 122 and interface unit 160 are arranged in side surface of the terminal body, and the second audio output modules 151*b* and the second camera 121*b* are arranged in rear surface of the terminal body.

However, alternative arrangements are possible and within the teachings of the instant disclosure. Some components can be omitted or rearranged. For example, the first manipulation unit 123*a* can be located on another surface of the terminal body, and the second audio output module 152*b* can be located on the side surface of the terminal body.

The display unit 151 outputs information processed in the mobile terminal 100. The display unit 151 can be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 can be implemented using two display devices, which can implement the same or different display technology. For instance, a plurality of the display units 151 can be arranged on one side, either spaced apart from each other, or these devices can be integrated, or these devices can be arranged on different surfaces.

The display unit 151 can also include a touch sensor which senses a touch input received at the display unit. When a touch is input to the display unit 151, the touch sensor can be configured to sense this touch and the controller 180, for example, can generate a control command or other signal corresponding to the touch. The content which is input in the touching manner can be a text or numerical value, or a menu item which can be indicated or designated in various modes.

The touch sensor can be configured in a form of a film having a touch pattern, disposed between the window 151*a* and a display on a rear surface of the window 151*a*, or a metal wire which is patterned directly on the rear surface of the window 151*a*. Alternatively, the touch sensor can be integrally formed with the display. For example, the touch sensor can be disposed on a substrate of the display or within the display.

The display unit 151 can also form a touch screen together with the touch sensor. Here, the touch screen can serve as the user input unit 123 (see FIG. 1A). Therefore, the touch screen can replace at least some of the functions of the first manipulation unit 123*a*. The first audio output module 152*a* can be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds can not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which can be manipulated by a user to provide input to the mobile terminal 100. The first and second manipulation units 123a and 123b can also be commonly referred to as a manipulating portion, and can employ any tactile method that allows the user to perform manipulation such as touch, push, scroll, or the like. The first and second manipulation units 123a and 123b can also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b can be used in various ways. For example, the first manipulation unit 123a can be used by the user to provide an input to a menu, home key, cancel, search, or the like, and the second manipulation unit 123b can be used by the user to provide an input to control a volume level being output from the first or second audio output modules 152a or 152b, to switch to a touch recognition mode of the display unit 151, or the like.

As another example of the user input unit 123, a rear input unit can be located on the rear surface of the terminal body. The rear input unit can be manipulated by a user to provide input to the mobile terminal 100. The input can be used in a variety of different ways. For example, the rear input unit can be used by the user to provide an input for power on/off, start, end, scroll, control volume level being output from the first or second audio output modules 152a or 152b, switch to a touch recognition mode of the display unit 151, and the like. The rear input unit can be configured to permit touch input, a push input, or combinations thereof.

The rear input unit can be located to overlap the display unit 151 of the front side in a thickness direction of the terminal body. As one example, the rear input unit can be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit can implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 can include a finger scan sensor which scans a user's fingerprint. The controller 180 can then use fingerprint information sensed by the finger scan sensor as part of an authentication procedure. The finger scan sensor can also be installed in the display unit 151 or implemented in the user input unit 123.

The microphone 122 is shown located at an end of the mobile terminal 100, but other locations are possible. If desired, multiple microphones can be implemented, with such an arrangement permitting the receiving of stereo sounds.

The interface unit 160 can serve as a path allowing the mobile terminal 100 to interface with external devices. For example, the interface unit 160 can include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 can be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a can alternatively be located at other locations, or made to be moveable, in order to have a different image capturing direction from that which is shown.

The second camera 121b can include a plurality of lenses arranged along at least one line. The plurality of lenses can also be arranged in a matrix configuration. The cameras can be referred to as an "array camera." When the second camera 121b is implemented as an array camera, images can be captured in various manners using the plurality of lenses and images with better qualities.

As shown in FIG. 1C, a flash 124 is shown adjacent to the second camera 121b. When an image of a subject is captured with the camera 121b, the flash 124 can illuminate the subject. As shown in FIG. 1C, the second audio output module 152b can be located on the terminal body. The second audio output module 152b can implement stereophonic sound functions in conjunction with the first audio output module 152a, and can be also used for implementing a speaker phone mode for call communication.

At least one antenna for wireless communication can be located on the terminal body. The antenna can be installed in the terminal body or formed by the case. For example, an antenna which configures a part of the broadcast receiving module 111 can be retractable into the terminal body. Alternatively, an antenna can be formed using a film attached to an inner surface of the rear cover 103, or a case that includes a conductive material.

A power supply unit 190 for supplying power to the mobile terminal 100 can include a battery 191, which is mounted in the terminal body or detachably coupled to an outside of the terminal body. The battery 191 can receive power via a power source cable connected to the interface unit 160. Also, the battery 191 can be recharged in a wireless manner using a wireless charger. Wireless charging can be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 can be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 can be provided. The cover or pouch can cooperate with the display unit 151 to extend the function of the mobile terminal 100. Another example of the accessory is a touch pen for assisting or extending a touch input to a touch screen.

Figure 2:
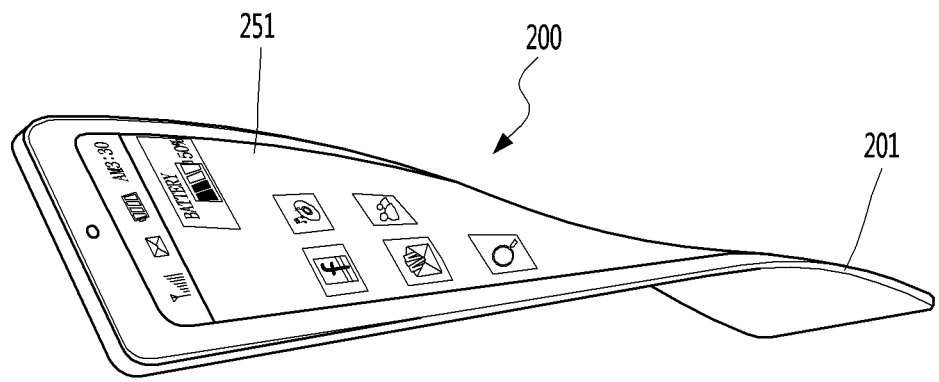
FIG. 2 is a conceptual view of a deformable mobile terminal according to an alternative embodiment of the present disclosure.

FIG. 2 is a conceptual view of a deformable mobile terminal according to an alternative embodiment of the present disclosure. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region can become a curved surface or a bent surface. As illustrated, information displayed in the second state can be visual information output on the curved surface. The visual information can be realized so a light emission of each unit pixel (sub-pixel) arranged in a matrix configuration is controlled independently. The unit pixel denotes an elementary unit for representing one color.

According to one alternative embodiment, the first state of the flexible display unit 251 can be a curved state (for example, a state of being curved from up to down or from right to left), instead of being in flat state. In this embodiment, when an external force is applied to the flexible display unit 251, the flexible display unit 251 can transition to the second state such that the flexible display unit is deformed into the flat state (or a less curved state) or into a more curved state.

If desired, the flexible display unit 251 can implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor can be included in the sensing unit 140. The deformation sensor can be located in the flexible display unit 251 or the case 201 to sense information related to the deforming of the flexible display unit 251. Examples of such information related to the deforming of the flexible display unit 251 can be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251. A battery located in the mobile terminal 200 can also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal can be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 can sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
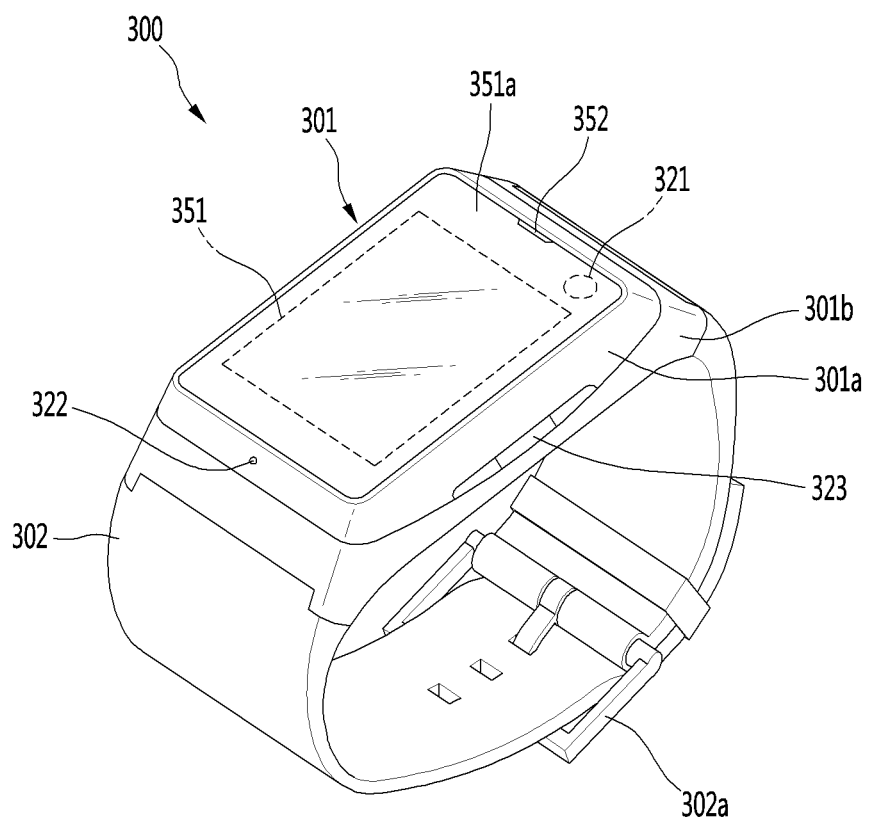
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 can be configured to include features that are the same or similar to that of mobile terminal 100 of FIGS. 1A-1C.

The main body 301 includes a case having a certain appearance. As illustrated, the case can include a first case 301a and a second case 301b cooperatively defining an inner space for accommodating various electronic components. Other configurations are possible. For instance, a single case can alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna can extend its function using the case. For example, a case including a conductive material can be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys can be minimized or eliminated. For example, when the touch screen is implemented, the user input unit 323 can be omitted.

The band 302 is commonly worn on the user's wrist and can be made of a flexible material for facilitating wearing of the device. As one example, the band 302 can be made of fur, rubber, silicon, synthetic resin, or the like. The band 302 can also be configured to be detachable from the main body 301. Accordingly, the band 302 can be replaceable with various types of bands according to a user's preference.

In one configuration, the band 302 can be used for extending the performance of the antenna. For example, the band can include therein a ground extending portion electrically connected to the antenna to extend a ground area. The band 302 can include fastener 302a. The fastener 302a can be implemented into a buckle type, a snap-fit hook structure, a Velcro® type, or the like, and include a flexible section or material. The drawing illustrates an example that the fastener 302a is implemented using a buckle.

Figure 4:
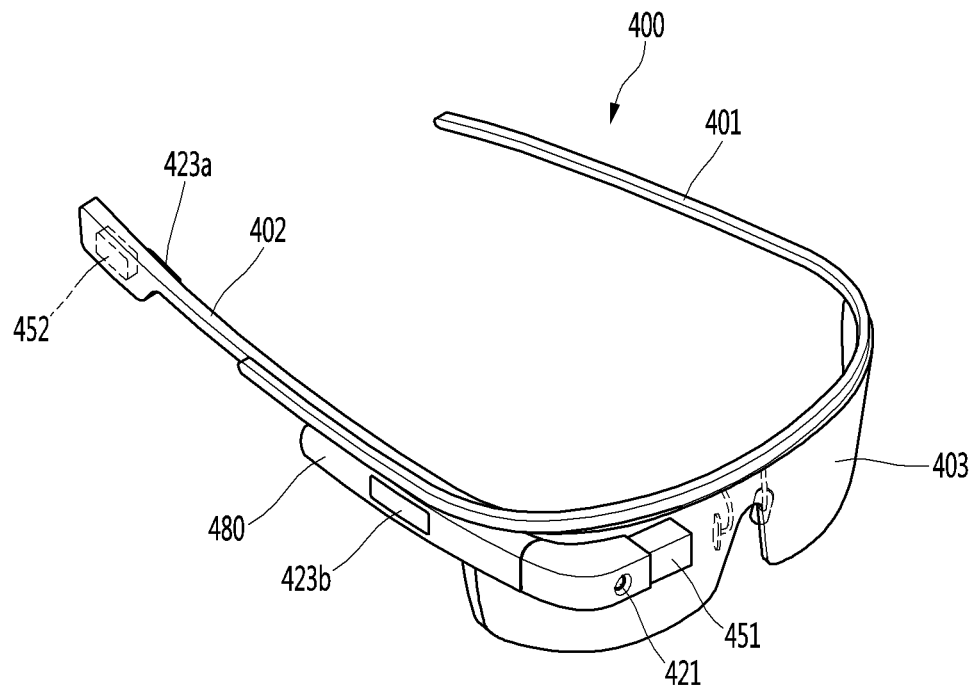
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame can be made of a flexible material to be easily worn. The frame of mobile terminal 400 is shown having a first frame 401 and a second frame 402, which can be made of the same or different materials. In general, mobile terminal 400 can be configured to include features that are the same or similar to that of mobile terminal 100 of FIGS. 1A-1C.

The frame can be supported on the head and defines a space for mounting various components. As illustrated, electronic components, such as a control module 480, an audio output module 452, and the like, can be mounted to the frame part. Also, a lens 403 for covering either or both of the left and right eyes can be detachably coupled to the frame part.

The control module 480 controls various electronic components disposed in the mobile terminal 400. The control module 480 can be understood as a component corresponding to the aforementioned controller 180. FIG. 4 illustrates that the control module 480 is installed in the frame part on one side of the head, but other locations are possible.

The display unit 451 can be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 can be located to correspond to either or both of the left and right eyes. FIG. 4 illustrates that the display unit 451 is located on a portion corresponding to the right eye to output an image viewable by the user's right eye.

The display unit 451 can project an image into the user's eye using a prism. Also, the prism can be formed from optically transparent material such that the user can view both the projected image and a general visual field (a range that the user views through the eyes) in front of the user. In such a manner, the image output through the display unit 451 can be viewed while overlapping with the general visual field. The mobile terminal 400 can provide an augmented reality (AR) by overlaying a virtual image on a realistic image or background using the display.

The camera 421 can be located adjacent to either or both of the left and right eyes to capture an image. Since the camera 421 is located adjacent to the eye, the camera 421 can acquire a scene that the user is currently viewing. The camera 421 can be positioned at most any location of the mobile terminal. In some embodiments, multiple cameras 421 can be utilized. Such multiple cameras 421 can be used to acquire a stereoscopic image.

The glass-type mobile terminal 400 may include user input units 423a and 423b, which can each be manipulated by the user to provide an input. The user input units 423a and 423b can employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system can be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines can be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector can include two or more different antennas. Each base station can be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite can be used. In particular, the GPS module can acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module. The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like can be taken for transmitted wireless signals.

The landmark method is used to measure a position of a mobile terminal using a known landmark transmitter. In addition to these position location methods, various algorithms can be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal can be configured to include short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal can transmit card information on a general IC card to the outside. More specifically, if a mobile terminal having card information on a payment card (e. g, a credit card or a bus card) approaches a card reader, a short-range mobile payment can be executed. As another example, if a mobile terminal which stores card information on an entrance card approaches an entrance card reader, an entrance approval procedure can start. A card such as a credit card, a traffic card, or an entrance card can be included in the security module in the form of applet, and the security module can store card information on the card mounted therein. Card information for a payment card can include any of a card number, a remaining amount and usage history, and the like. Card information of an entrance card can include any of a user's name, a user's number (e.g., undergraduate number or staff number), an entrance history, and the like.

When the NFC module operates in a reader mode, the mobile terminal can read data from an external tag. The data received from the external tag by the mobile terminal can be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller can execute a browser (e.g., Internet browser). If the data received from the external tag is a text type, the controller can execute a text viewer. If the data received from the external tag is a URI type, the controller can execute a browser or originate a call. If the data received from the external tag is a general control type, the controller can execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) can be applied to the P2P communication. For P2P communication, connection can be generated between the mobile terminal and another mobile terminal. This connection can be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. can be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 5:
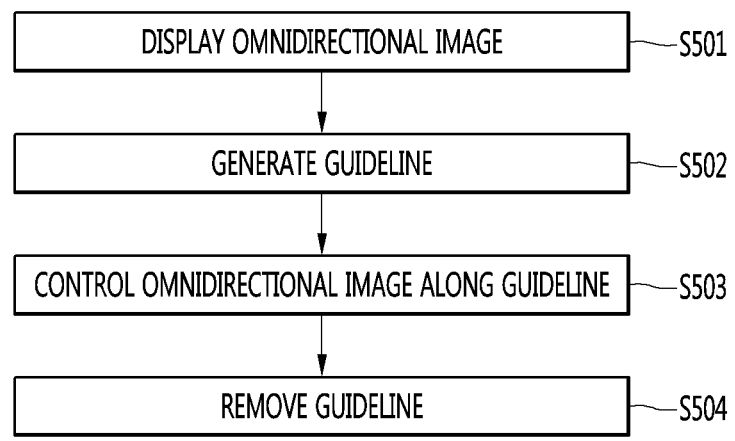
FIG. 5 is a flowchart illustrating a method for operating the mobile terminal according to an embodiment of the present disclosure.

FIG. 5 is a flowchart illustrating a method for operating the mobile terminal according to an embodiment of the present disclosure. Hereinafter, the mobile terminal 100 will be described in conjunction with FIGS. 1A to 4. Referring to FIG. 5, the controller 180 of the mobile terminal 100 displays an omnidirectional image through the display unit 151 (S501).

In an embodiment, the omnidirectional image can be a content image stored in the mobile terminal 100 itself, an image provided from another mobile terminal connected to the mobile terminal 100, or be provided from a computer or server capable of wiredly or wirelessly communicating with the mobile terminal 100.

Further, the omnidirectional image can be an image including information in all directions such as top, bottom, left, and right directions. For example, the omnidirectional image can include an image of the entire celestial sphere viewed at the center of the celestial sphere. The omnidirectional image can also be an image including both a still image and a moving image.

The controller 180 of the mobile terminal 100 can display a partial area of the omnidirectional image on the display unit 151. When a partial area of the omnidirectional image is displayed on a display unit 151, the controller 180 can allow the displayed partial area to be displayed without distortion. However, when a partial area of the omnidirectional image is displayed on the display unit 151, only a portion of the omnidirectional image is displayed on the display unit 151 due to the limitation of the angle of view.

When the controller 180 of the mobile terminal 100 allows more areas of the omnidirectional image to be displayed on the display unit 151, a screen may be distortedly displayed. Also, the omnidirectional image may be an image not including a partial image in information in all directions such as top, bottom, left, and right directions.

Referring to FIG. 5, the controller 180 of the mobile terminal 100 displays a guideline generated in the omnidirectional image through the display unit 151 (S502). Further, the controller 180 of the mobile terminal 100 can generate, through a user input, the guideline corresponding to the user input.

The controller 180 can receive a gesture input by a user of the mobile terminal 100 through the display unit 151, and display the guideline corresponding to the gesture on the display unit 151. The controller 180 of the mobile terminal 100 can also automatically generate a guideline. Further, the controller 180 can receive a gesture input by the user of the mobile terminal 100. Alternatively, when a previously stored guideline exists, the controller 180 can automatically generate the guideline.

A method in which the controller 180 receives a gesture input by the user of the mobile terminal 100 through the display unit 151 to generate a guideline and display the guideline on the display unit 151 and a method in which the controller 180 automatically generate a guideline will be described in detail with reference to FIGS. 7A to 11E.

Referring to FIG. 5, the controller 180 of the mobile terminal 100 controls the omnidirectional image through the guideline (S503). In particular, the controller 180 moves a display area of the omnidirectional image along the guideline. If a scroll gesture of the user is input, the controller 180 does not move the display area of the omnidirectional image along the direction of the scroll gesture but moves the display area of the omnidirectional image by considering only a component corresponding to the direction of the guideline in the direction of the scroll gesture. That is, the controller 180 can control the display area of the omnidirectional image to move in only a direction corresponding to the guideline.

In addition, the controller 180 can move the display area of the omnidirectional image along a plurality of guidelines. If a scroll gesture of the user is input, the controller 180 does not move the display area of the omnidirectional image along the direction of the scroll gesture but moves the display area of the omnidirectional image by considering only a component corresponding to the direction of a guideline adjacent to a scroll direction. That is, the controller 180 can control the display area of the omnidirectional image in only a direction corresponding to each of the plurality of guidelines.

In addition, the controller 180 can change the direction of a guideline. If a gesture of the user is input, the controller 180 can change the direction of a guideline corresponding to the gesture of the user. When a plurality of guidelines exist, the controller 180 can control the plurality of guidelines to be sequentially applied according to their priority orders.

Referring to FIG. 5, the controller 180 of the mobile terminal removes a set guideline in the omnidirectional image (S504). Further, when a gesture of the user is input, the controller 180 removes a set guideline corresponding to the gesture. In addition, when a gesture of the user is input, the controller 180 can not display a set guideline corresponding to the gesture on the display unit 151. Hereinafter, steps S501 to S504 will be described in detail. In particular, FIGS. 6A to 6F are views illustrating a typical example of moving a display area of an omnidirectional image by scrolling the omnidirectional image.

Figure 6A:
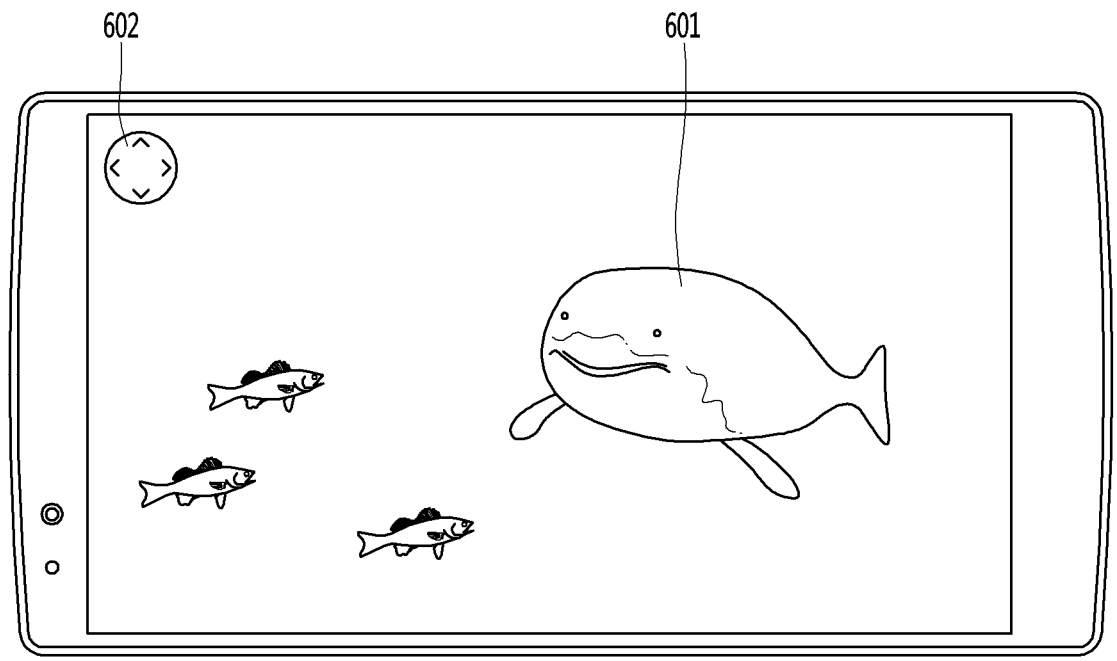
FIGS. 6A to 6F are views illustrating a typical example of moving a display area of an omnidirectional image by scrolling the omnidirectional image.
Figure 6B:
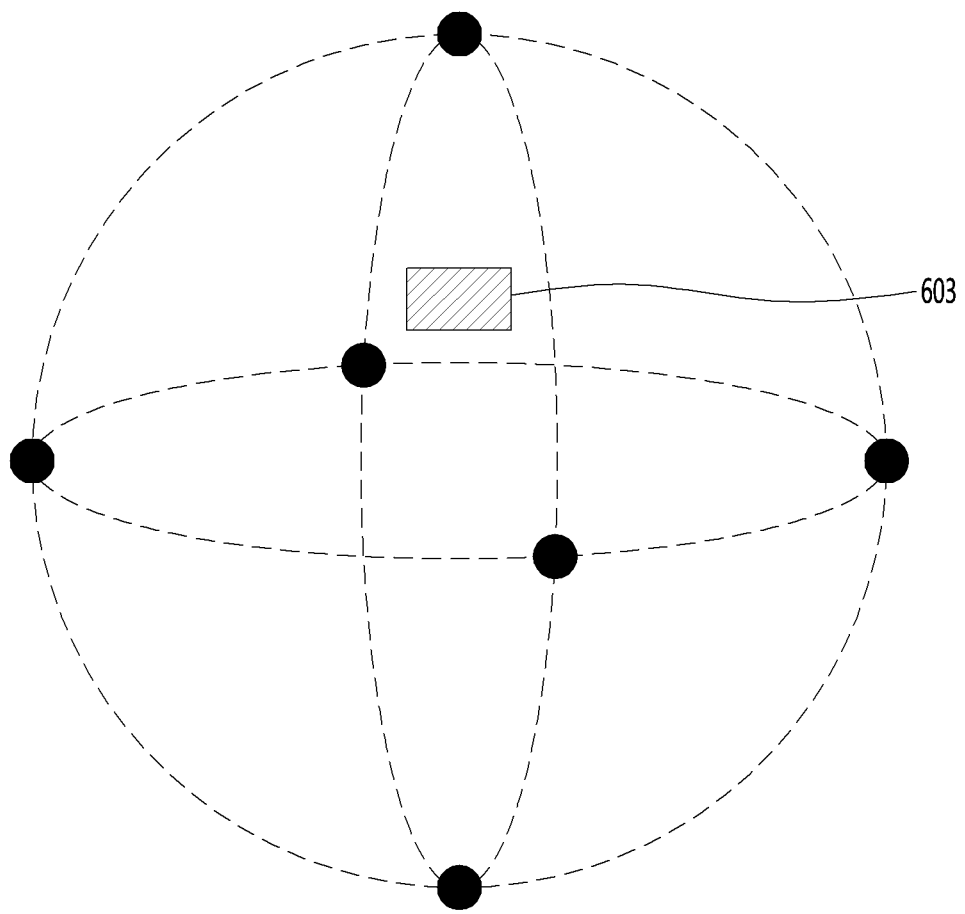

Referring to FIGS. 6A and 6B, the controller 180 of the mobile terminal 100 can display a partial area of an omnidirectional image. The omnidirectional image, as described above, can include an image corresponding to all areas of a virtual celestial sphere, and the controller 180 can display a partial area of the omnidirectional image that is an image corresponding to all of the areas of the celestial sphere. For example, FIG. 6A illustrates the mobile terminal 100 that displays an omnidirectional image photographed in water, and a partial area of the omnidirectional image including a first object 601 is displayed on the display unit 151. The user of the mobile terminal 100 can move a display area of the omnidirectional image.

FIG. 6B indicates a portion of the omnidirectional image, which is displayed in FIG. 6A. A display area 603 refers to an area that the controller 180 displays on the display unit 151 in FIG. 6A. Therefore, the controller 180 can display, on the display unit 151, the display area 603 that is a portion of the omnidirectional image. However, the size of the display area 603 is not limited, and can be enlarged or reduced.

The user of the mobile terminal 100 can move the display area of the omnidirectional image using a control area 602. For example, when an input of the user is input to an area corresponding to the right side in the control area 602, the controller 180 can move, to the right side, the display area of the omnidirectional image, which is displayed in the mobile terminal 100. Also, for example, when an input of the user is input to an area corresponding to the upper side in the control area 602, the controller 180 can move, to the upper side, the display area of the omnidirectional image, which is displayed in the mobile terminal 100.

Figure 6C:
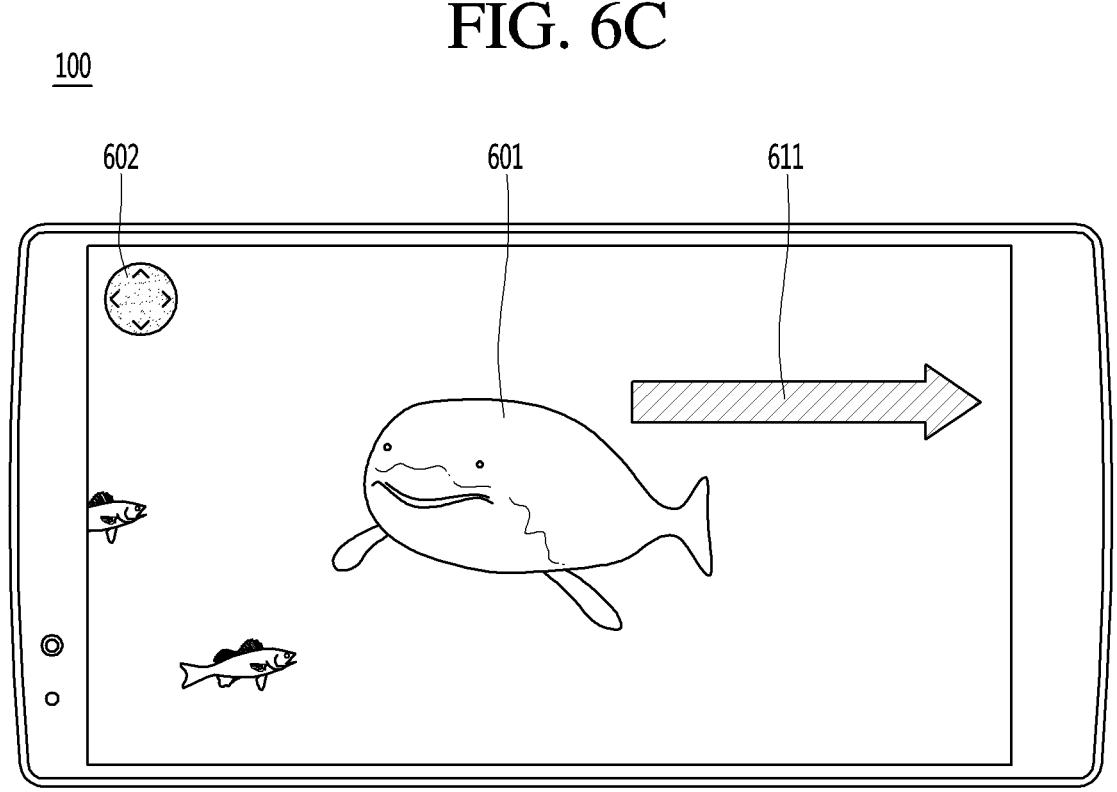

Referring to FIG. 6C, if a scroll gesture is input from the user through the display unit 151, the controller 180 of the mobile terminal 100 can move the display area of the omnidirectional image in a direction corresponding to the scroll gesture. For example, if a scroll gesture moving to the right side is input, the controller 180 can move the display area of the omnidirectional image, which is displayed in the mobile terminal 100. Thus, it can be seen that the first object 601 has been moved from the right side to the left side of a screen as the display area is changed.

Figure 6D:
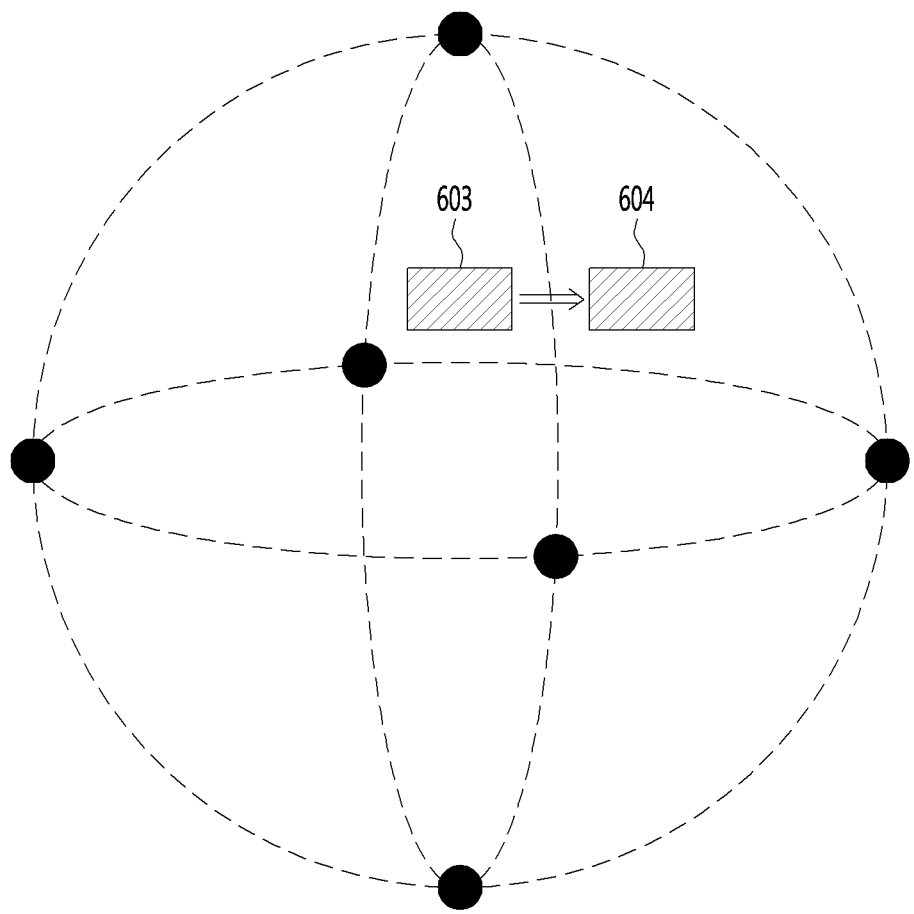
Figure 6E:
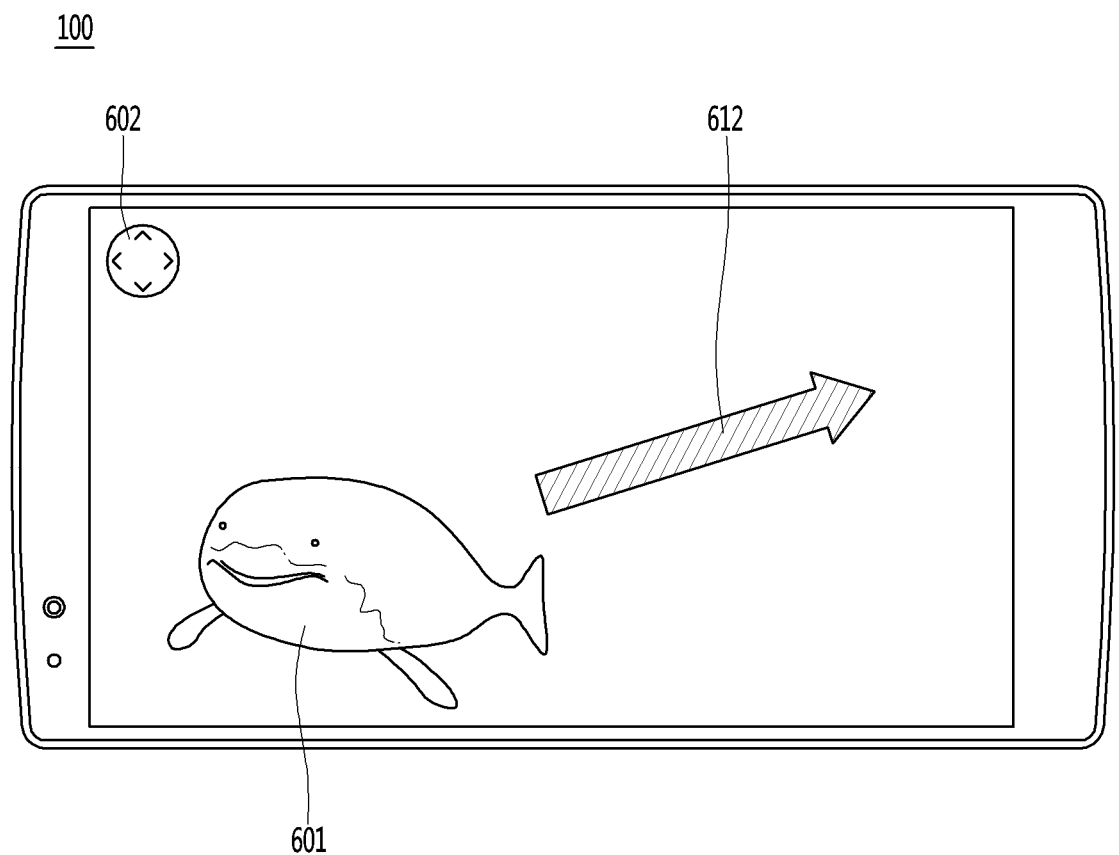

Referring to FIG. 6D, if a scroll gesture moving to the right side is input, the controller 180 moves, to the right side, the display area of the omnidirectional image, which is displayed in the mobile terminal 100. Therefore, the display area of the omnidirectional image can be moved from the display area 603 to a display area 604. Referring to FIG. 6E, if a scroll gesture is input from the user through the display unit 151, the controller 180 of the mobile terminal 100 can move the display area of the omnidirectional image in a direction corresponding to the scroll gesture.

However, when a scroll gesture is input, an error different from an intention of the user of the mobile terminal 100 may occur. For example, when the user who desires to move the display area of the omnidirectional to the right side as shown in FIG. 6C inputs a wrong gesture 612 to the display unit 151, the display area of the omnidirectional image is moved to a right upper portion, differently from the intention of the user.

Figure 6F:
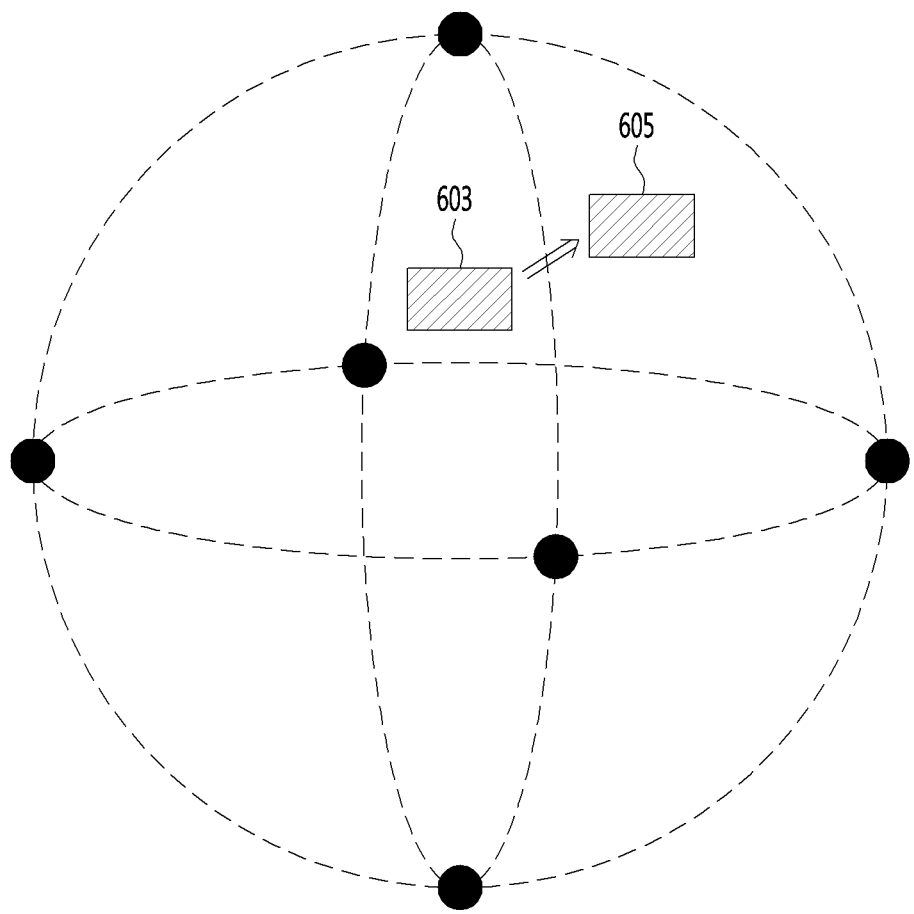

Referring to FIG. 6F, if the user inputs the wrong gesture 612, the controller 180 does not move the display area of the omnidirectional image, which is displayed in the mobile terminal 100, to the right side to which the user intends to move the display area of the omnidirectional image, but moves the display area of the omnidirectional image based on the wrong gesture 612 of the user. Therefore, the display area of the omnidirectional image is moved from the display area 603 to a display area 605, differently from the intention of the user.

As described above, when a display area of an omnidirectional image is to be moved in a specific direction such as a horizontal direction of the surface of the ground or water, the display area of the omnidirectional image can be moved in an unintended direction due to an inaccurate input of a user.

Next, FIGS. 7A to 7E are views illustrating an example of setting a guideline in an omnidirectional image and moving a display area of the omnidirectional image using the set guideline according to an embodiment of the present disclosure. In FIGS. 7A to 7E, it is assumed that the user controls the omnidirectional image through the display unit 151 of the mobile terminal 100.

When a partial area of an omnidirectional image is displayed on the display unit 151 of the mobile terminal 100, the controller 180 of the mobile terminal 100 can receive a gesture for generating a guideline, input from the user. For example, the controller 180 of the mobile terminal 100 can receive a multi-touch gesture selecting a first touch 701 and a second touch 702.

When the multi-touch gesture including the first touch 701 and the second touch 702 is input to the display unit 151, the controller 180 of the mobile terminal 100 can generate a guideline 703 corresponding to a straight line connecting the first touch 701 and the second touch 702. However, the guideline 703 is not limited to one displayed on the display unit 151. That is, the guideline 703 can be a straight line including the first touch 701 and the second touch 702, but is not limited to a line segment connecting the first touch 701 and the second touch 702.

For example, the guideline 703 can be a curved line instead of the straight line. That is, the shape of the guideline 703 is not limited to a specific shape, and can include all shapes in which the center of a display area of omnidirectional image is consecutively displayed.

Figure 7A:
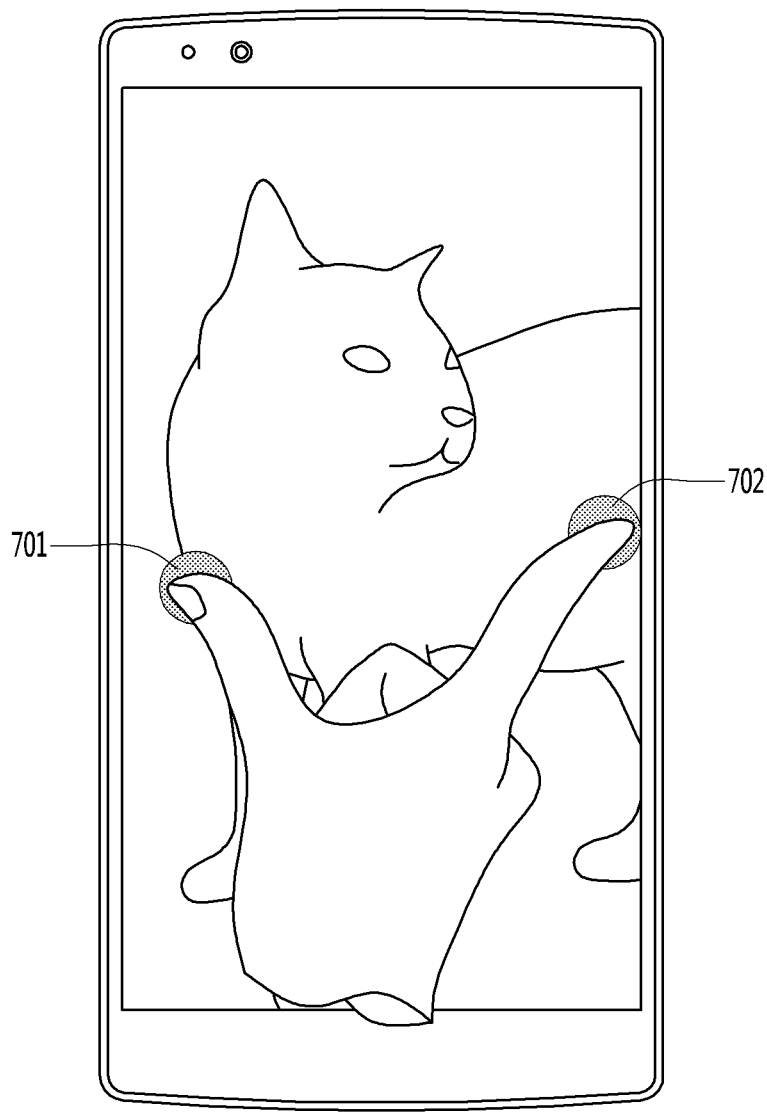
FIGS. 7A to 7E are views illustrating an example of setting a guideline in an omnidirectional image and moving a display area of the omnidirectional image using the set guideline according to an embodiment of the present disclosure.
Figure 7B:
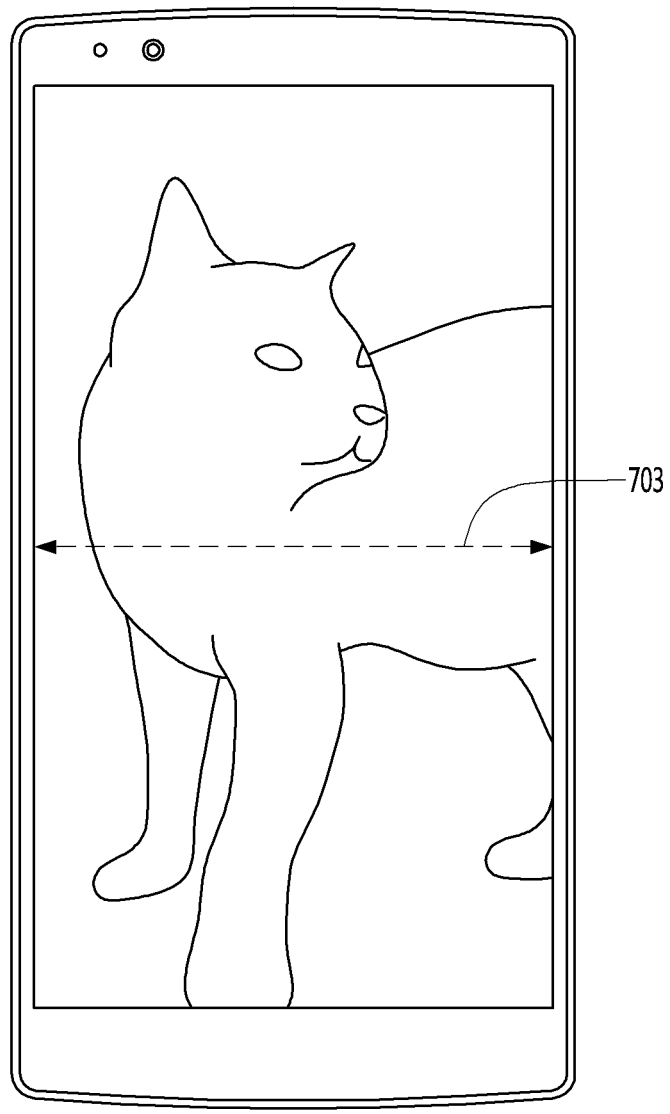
Figure 7C:
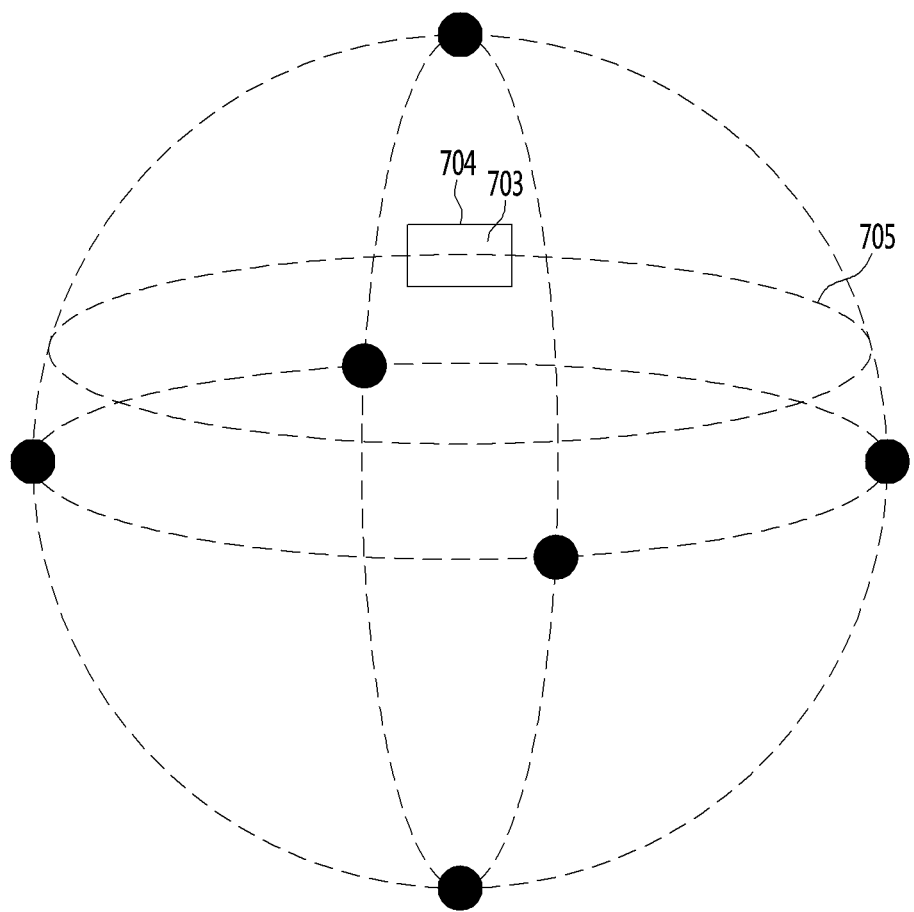

Referring to FIG. 7C, a display area 704 displayed in FIG. 7B is a portion of the omnidirectional image, and a portion of the guideline 703 is merely displayed in the display area 704. The guideline 703 can be a portion of a line 705 set in the entire omnidirectional area. Therefore, the user can move the display area 704 along the line 705 set in the entire omnidirectional area. Accordingly, the display area can be moved in a direction corresponding to an intention of the user.

Figure 7D:
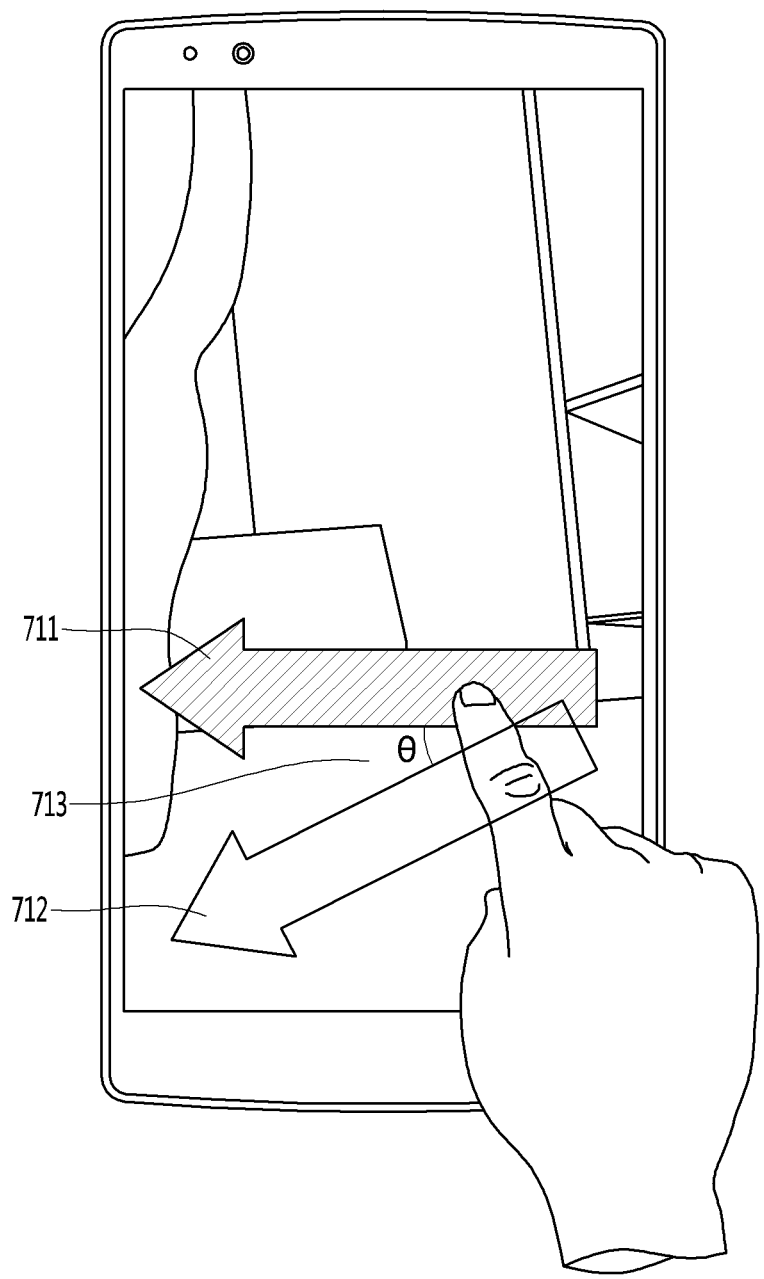

Referring to FIG. 7D, when a gesture of the user is input to the display unit 151, the controller 180 of the mobile terminal 100 can limit the movement of a display area of the omnidirectional image to a direction corresponding to the guideline 703. For example, when a first direction corresponding to a first scroll gesture 711 corresponds to the direction of the guideline 703, the controller 180 can move the display area of the omnidirectional image in the first direction when the first scroll gesture 711 corresponding to the first direction is input.

However, when a second scroll gesture 712 corresponding to a second direction is input to the display unit 151, the controller 180 can move the display area of the omnidirectional image along the guideline in the first direction instead of the second direction. The controller 180 can measure the length and speed of a scroll gesture input to the display unit 151. The controller 180 can also determine a degree of movement of the display area of the omnidirectional image, using an angle 713 between the guideline and the second scroll gesture 712.

Specifically, the controller 180 can control the display area of the omnidirectional image, using a directional component corresponding to the guideline 703 of the second scroll gesture 712. For example, it may be assumed that the first scroll gesture 711 and the second scroll gesture 712 are gestures that have different directions and the same magnitude. That is, it may be assumed that the respective scroll gestures are directional vectors that have the same magnitude and different directions, and the controller 180 can obtain a new vector by performing an inner product on the second scroll gesture 712 and the angle 713.

The controller 180 can move the display area of the omnidirectional image with a magnitude corresponding to the new vector in a direction corresponding to guideline 703. That is, the magnitude corresponding to the new vector is a magnitude obtained by performing the inner product on the magnitude of the input second scroll gesture 712 to correspond to the angle 713, and the controller 180 can move the display area of the omnidirectional image in a direction of the guideline 703.

In other words, when a scroll gesture corresponding to the guideline 703 is input, the display area of the omnidirectional image can be moved to correspond to the magnitude of the input scroll gesture. However, when a scroll gesture is input in a direction different from that of the guideline 703, the display area of the omnidirectional image is moved in the same direction as the guideline 703, but the moving speed of the display area of the omnidirectional image can be decreased.

Accordingly, the controller 180 can notify that an input of the user is inaccurate while moving the display area of the omnidirectional image in the direction corresponding to the guideline 703. In addition, the controller 180 can constantly change the display area of the omnidirectional image in the direction corresponding to the guideline 703. However, the controller 180 can move the display area of the omnidirectional image in the direction corresponding to the guideline 703 in a state in which the magnitude of the second scroll gesture 712 is maintained.

Further, the guideline 703 can be displayed on the display unit 151. However, when the guideline 703 is displayed on the display unit 151 of the mobile terminal 100, the guideline 703 can interrupt the user to view the omnidirectional image. Therefore, the controller 180 can not display the guideline 703 on the display unit 151 of the mobile terminal 100.

Figure 7E:
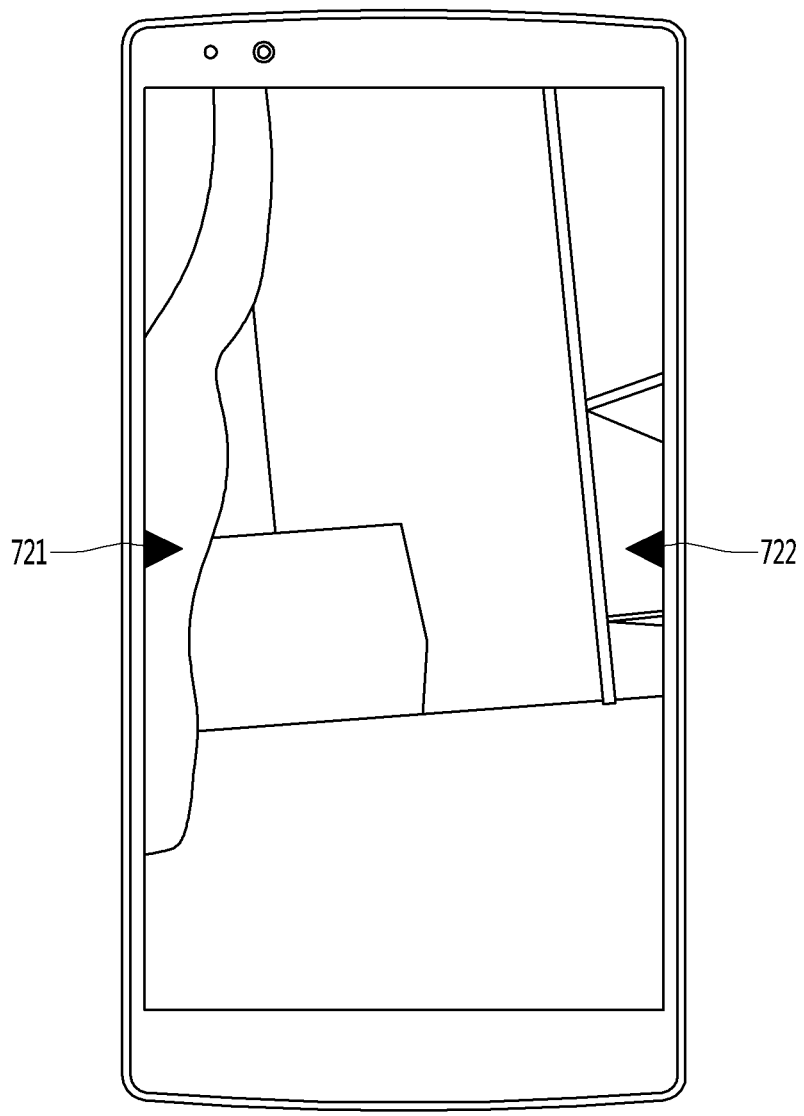

Referring to FIG. 7E, guide indicators 721 and 722 can be displayed on the display unit 151. For example, the guide indicators 721 and 722 can be marks displayed at points at which the guideline 703 meets an edge of the display unit 151. The guide indicators 721 and 722 can be displayed as a plurality of marks. When the guide indicators 721 and 722 are connected to each other, a straight line corresponding to the guideline 703 can be obtained.

Accordingly, when the guide indicators are displayed, the user of the mobile terminal 100 can be provided with a clear image, as compared with when the guideline 703 is displayed.

Figure 8A:
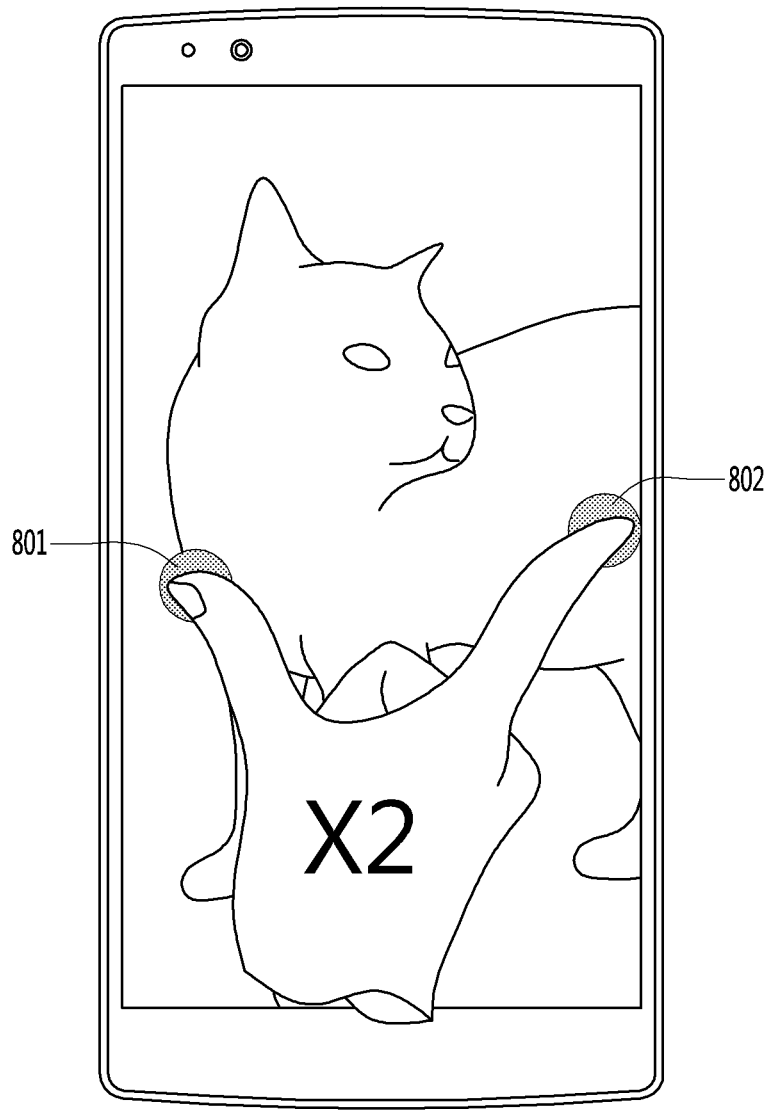

Next, FIGS. 8A to 8D are views illustrating an example of automatically setting a guideline in an omnidirectional image according to an embodiment of the present disclosure. Referring to FIG. 8A, when a gesture of the user is input to the display unit 151, the controller 180 can automatically generate a guideline. For example, when a double touch is simultaneously input to a first area 801 and a second area 802 on the display unit 151, the controller 180 can automatically generate a guideline.

Figure 8B:
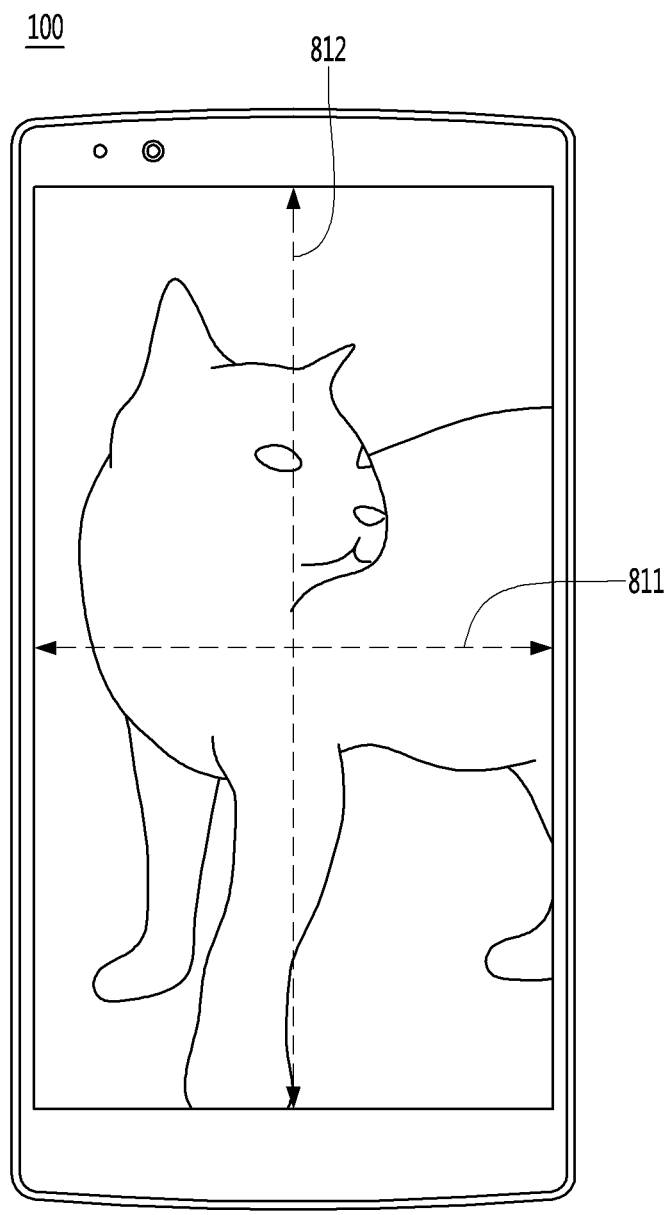

Referring to FIG. 8B, the generated guideline can be a guideline 811 horizontal to a screen displayed on the display unit 151 of the mobile terminal 100 or a guideline 812 vertical to the screen displayed on the display unit 151. The guideline 811 horizontal to the screen displayed on the display unit 151 and the guideline 812 vertical to the screen displayed on the display unit 151 correspond to the left/right and the top/bottom of the control area 602 displayed in FIG. 6A, respectively.

However, only one of the guideline 811 horizontal to the screen displayed on the display unit 151 and the guideline 812 vertical to the screen displayed on the display unit 151 can be generated. In addition, the guideline 811 horizontal to the screen displayed on the display unit 151 and the guideline 812 vertical to the screen displayed on the display unit 151 can be simultaneously generated.

Referring to FIG. 8C, the display area displayed in FIG. 8B is a portion of the omnidirectional image. A portion of the guideline 812 vertical to the screen is merely displayed in the display area, and the guideline 812 vertical to the screen can be a portion of a line 813 set in the entire omnidirectional area. Therefore, the user can move the display area along the line 813 set in the entire omnidirectional area. Also, a portion of the guideline 811 horizontal to the screen is merely displayed, and the guideline 811 horizontal to the screen can be a portion of a line 814 set in the entire omnidirectional area. Therefore, the user can move the display area along the line 814 set in the entire omnidirectional area.

In addition, the gesture of the user is not limited to the double touch simultaneously input to the first area 801 and the second area 802 on the display unit 151, and the controller 180 can set another gesture for automatically generating a guideline according to a setting of the user, etc. In addition, the generated guideline is not limited to the guideline 811 horizontal to the screen displayed on the display unit 151 of the mobile terminal 100 or the guideline 812 vertical to the screen displayed on the display unit 151, and can be generated in various directions.

As the user inputs a simple gesture to the display unit 151 of the mobile terminal 100, the user can easily obtain a guideline horizontal or vertical to the display unit 151. Accordingly, the user can more easily control the omnidirectional image.

Figure 8D:
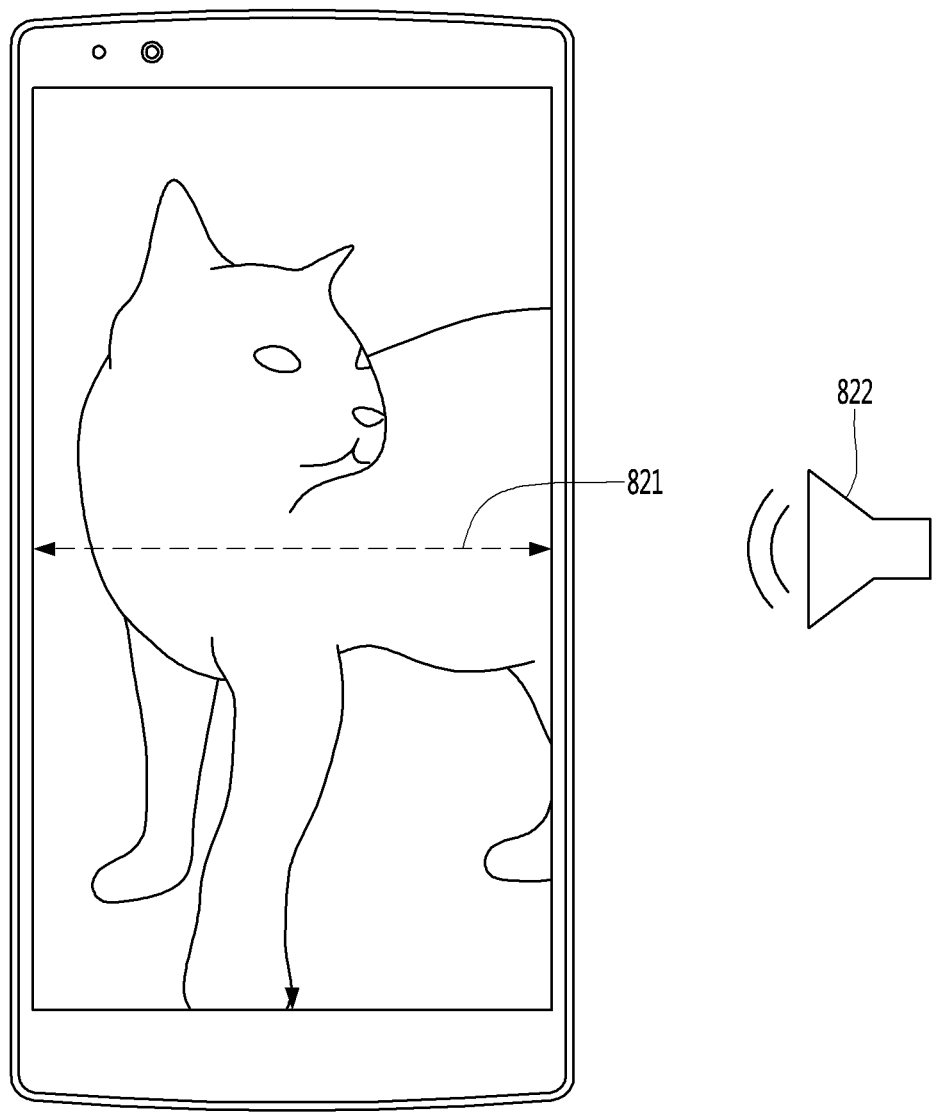

Referring to FIG. 8D, the controller 180 can recognize a sound 822 therearound and generate a guideline 821 corresponding to a direction in which the sound 822 is emitted. As the user of the mobile terminal 100 recognizes the sound 822 therearound, the user can move the display area of the omnidirectional image along the guideline 821 corresponding to the direction in which the sound 822 is emitted. Accordingly, an object that generates the sound can be more easily displayed on the display unit 151 of the mobile terminal 100.

Next, FIGS. 9A to 9E are views illustrating an example of setting a guideline in an omnidirectional image and moving a display area of the omnidirectional image along the set guideline according to another embodiment of the present disclosure. Referring to FIGS. 9A to 9E, the controller 180 can receive two points in an omnidirectional image, which the user inputs, and generate a guideline connecting the two input points.

For example, the controller 180 can receive a first point 901 on the display unit 151 through a gesture input by the user. The kind of the input gesture is not limited. The controller 180 can obtain information on the first point 901 through various gestures such as a long touch, a double touch, and a force touch.

Figure 9A:
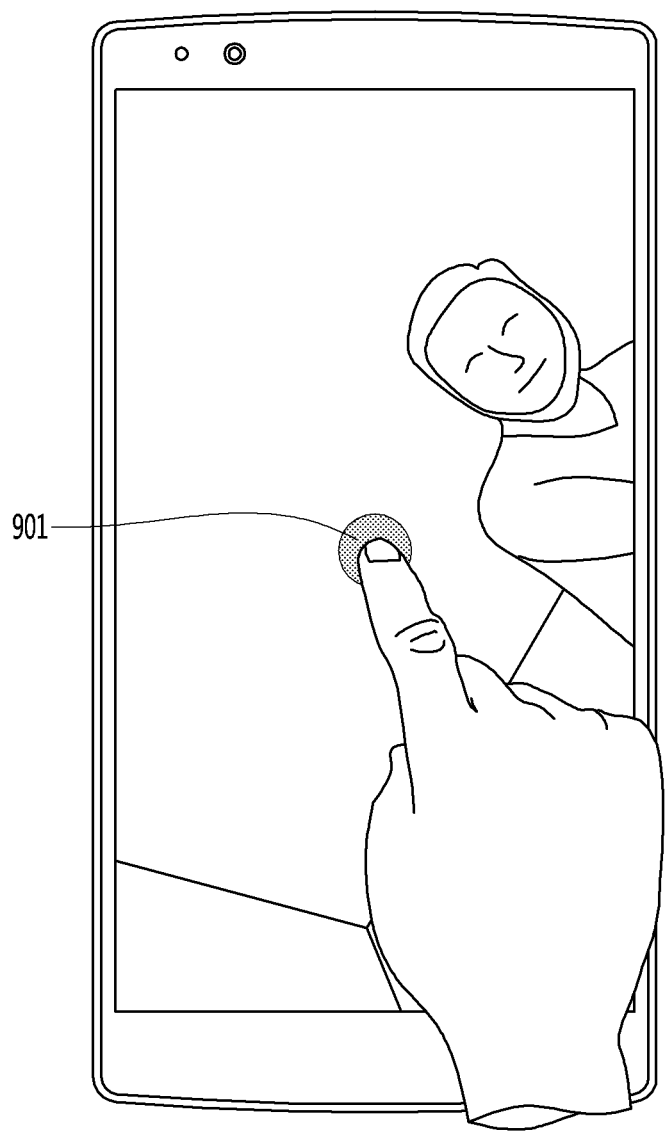
FIGS. 9A to 9E are views illustrating an example of setting a guideline in an omnidirectional image and moving a display area of the omnidirectional image along the set guideline according to another embodiment of the present disclosure.
Figure 9B:
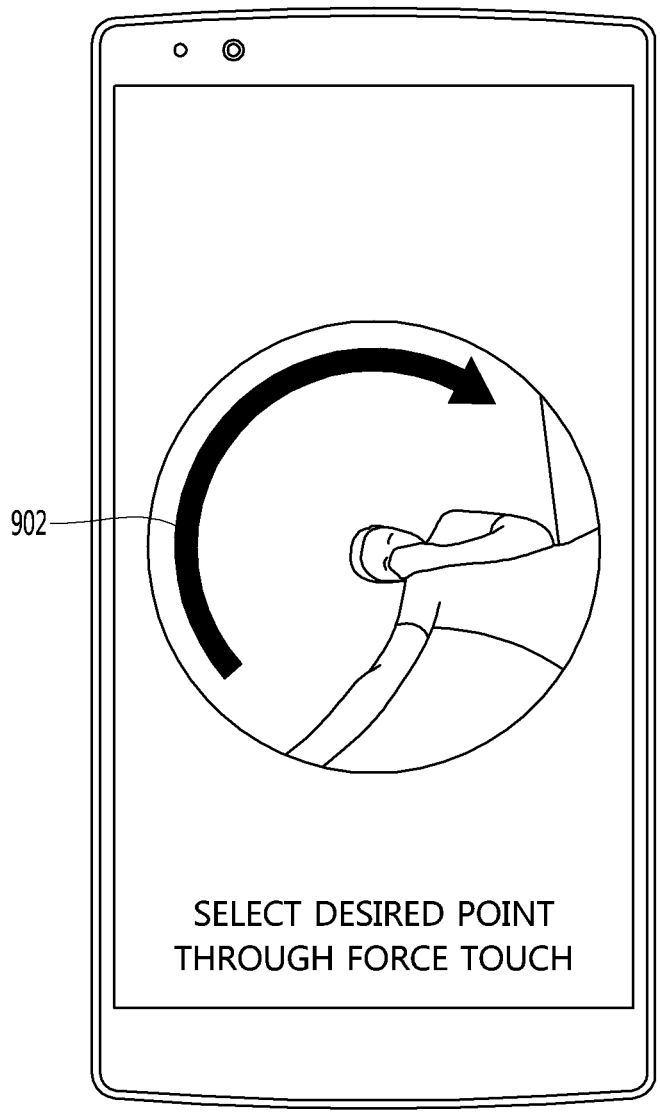
Figure 9C:
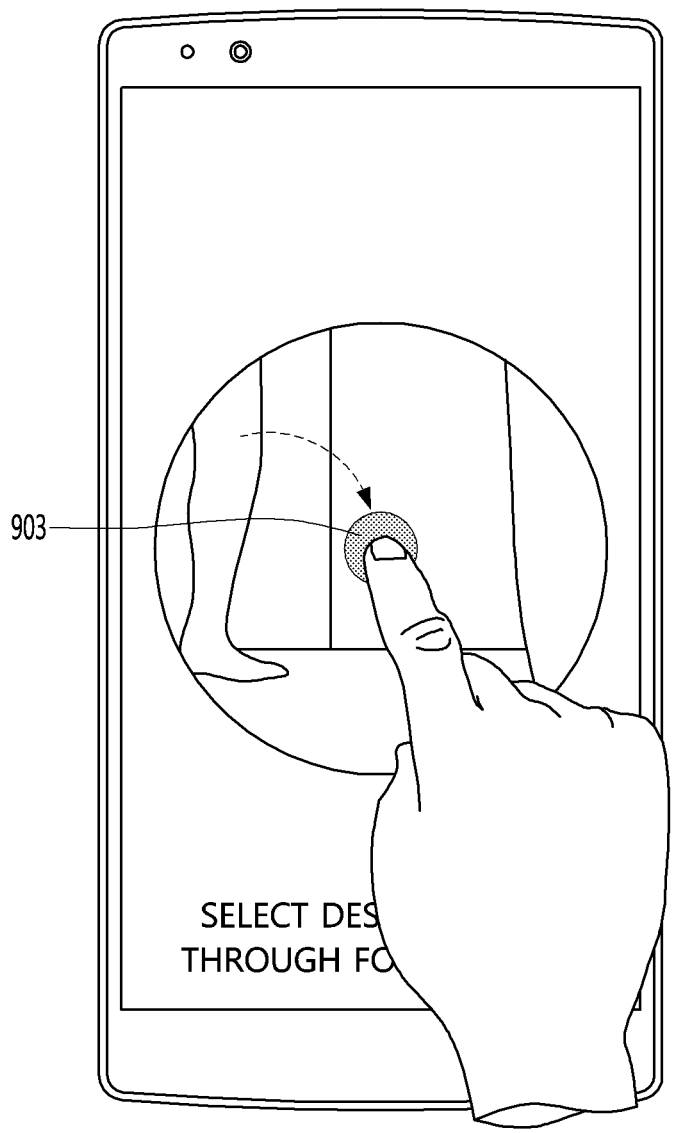

Further, if the first point 901 is input, the controller 180, as shown in FIG. 9B, can display an omnidirectional image 902 that is reduced in a spherical shape so as to perform fast screen conversion. When the omnidirectional image is displayed in the spherical shape, the screen is distorted, but a wider area can be displayed, so that a display area of the omnidirectional image can be more rapidly moved to a desired area.

In addition, the controller 180 does not convert a screen into that in a spherical shape, but can move the display area of the omnidirectional image through a scroll gesture. The controller 180 can receive a second point 903 input from the user through the display unit 151. The second point 903 can be designated even in an image in which the omnidirectional image is displayed in a spherical shape, and be specified even in an image in which a certain area of the omnidirectional image is displayed.

Figure 9D:
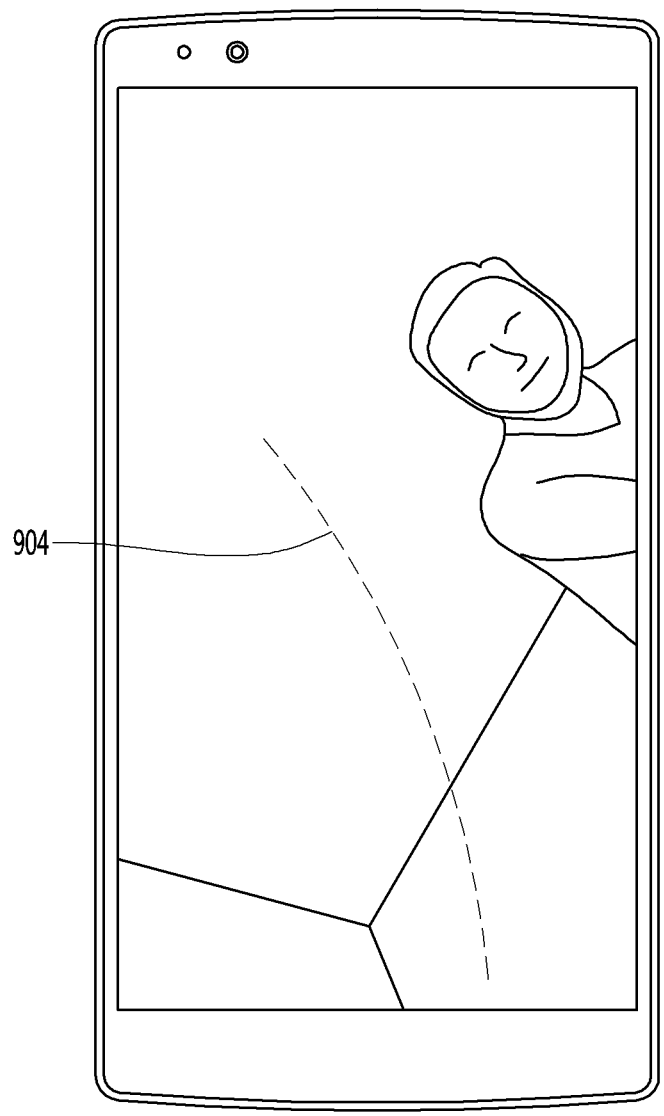

The controller 180 can generate a guideline 904 by connecting the first point 901 and the second point 903. The guideline 904, as shown in FIG. 9D, can be displayed by connecting the first point 901 and the second point 903, and be displayed as a curved line obtained by connecting a point and a point. Alternatively, the guideline 904 can be displayed as a line segment, a half line, a straight line, or the like, which is obtained by connecting a point and a point.

Figure 9E:
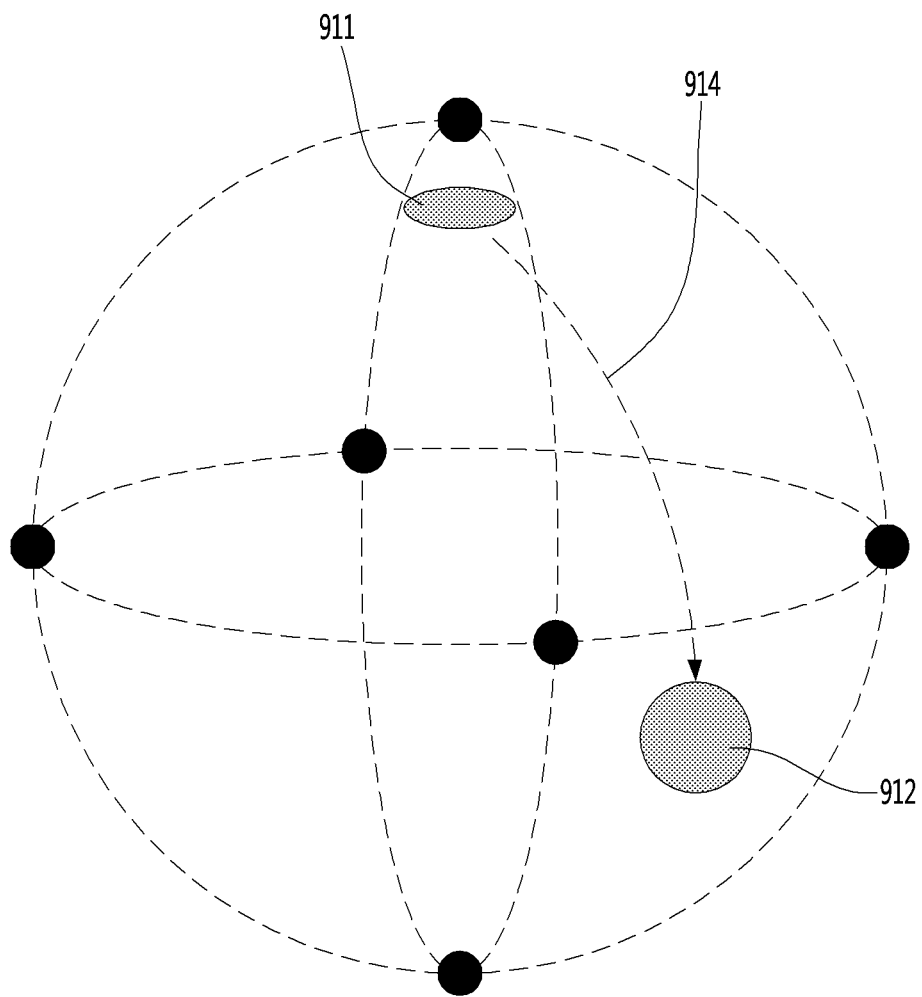

In more detail, referring to FIG. 9E, an omnidirectional image in the shape of a celestial sphere can be displayed in FIG. 9E. The first point 901 corresponds to a third point 911 of the omnidirectional image displayed as the celestial sphere, and the second point 903 corresponds to a fourth point 912 of the omnidirectional image. The user of the mobile terminal 100 can select the first point 901 corresponding to the third point 911 and generate the second point 203 by moving the display area of the omnidirectional image to the fourth point 912.

The controller 180 can generate the guideline 904 corresponding to a line segment 914 on the celestial sphere, which connects the first point 901 and the second point 903. The user of the mobile terminal 100 can use the display area of the omnidirectional image along the generated guideline, so that the display area of the omnidirectional image can be more easily controlled.

Figure 10A:
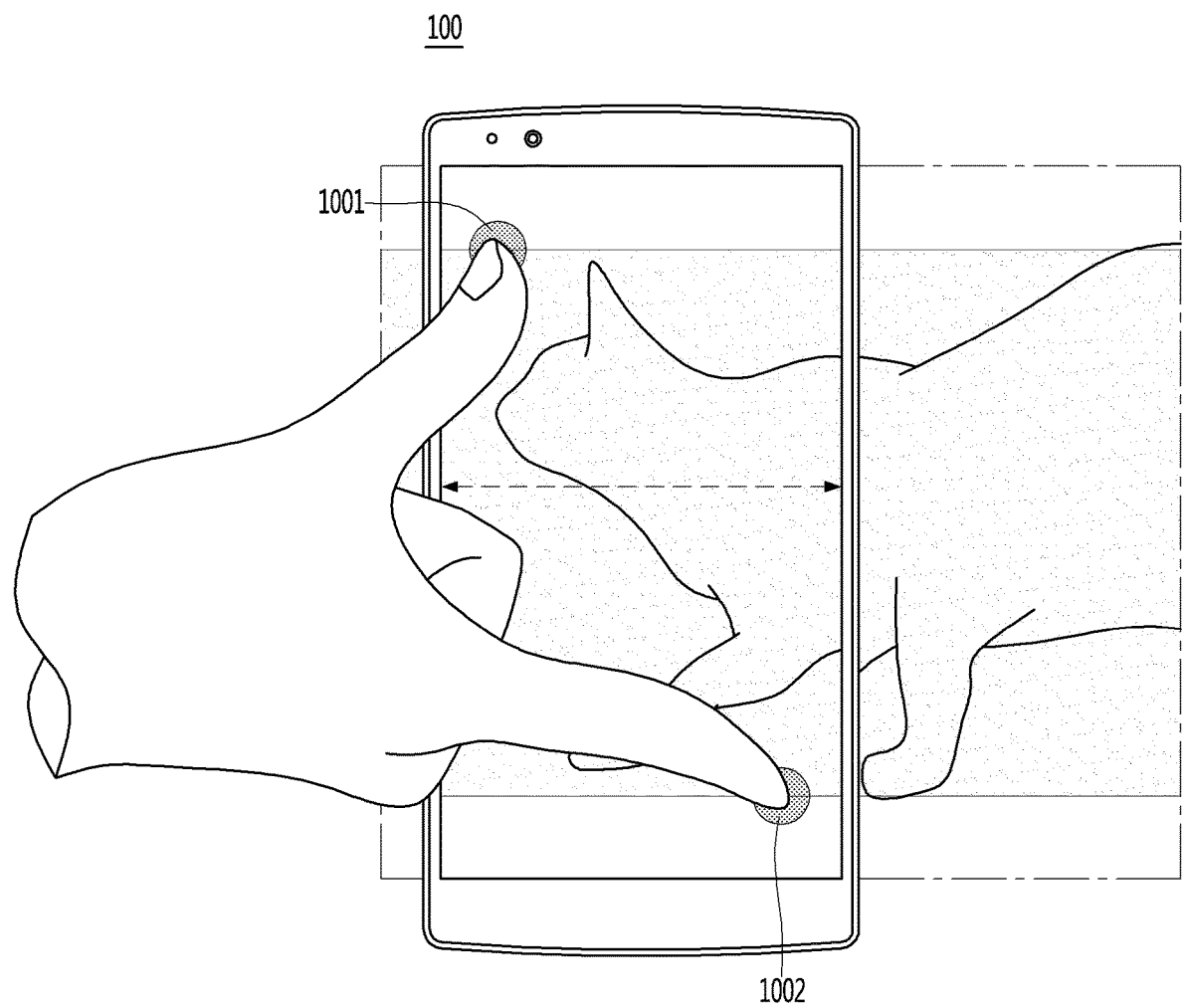
FIGS. 10A to 10D are views illustrating an example of setting a guideline in an omnidirectional image and moving a display area of the omnidirectional image using the set guideline according to another embodiment of the present disclosure.

FIGS. 10A to 10D are views illustrating an example of setting a guideline in an omnidirectional image and moving a display area of the omnidirectional image using the set guideline according to another embodiment of the present disclosure. Referring to FIG. 10A, if a gesture for designating an area larger than a previously designated area of an omnidirectional image displayed on the display unit 151 is input after a guideline is set, the controller 180 of the mobile terminal 100 can allow a display area to be moved in a state in which the size of the omnidirectional image is fixed along the guideline, based on a screen.

For example, as shown in FIG. 10A, a gesture for selecting a first point 1001 and a second point 1002 can be input. The gesture can include various gestures such as a force touch, a long touch, and a double touch. When the gesture for selecting the first point 1001 and the second point 1002 is input, and the distance between the first point 1001 and the second point 1002 exceeds 50% of the partial area of the omnidirectional image, which is displayed as shown in FIG. 10A, the size of the displayed omnidirectional image can be fixed. However, the reference of 50% can be changed by a selection of the user, etc. As the size of the display omnidirectional image is fixed, the user can more easily change the display area of the omnidirectional image without any problem that the size of the omnidirectional image is changed due to a malfunction.

Figure 10B:
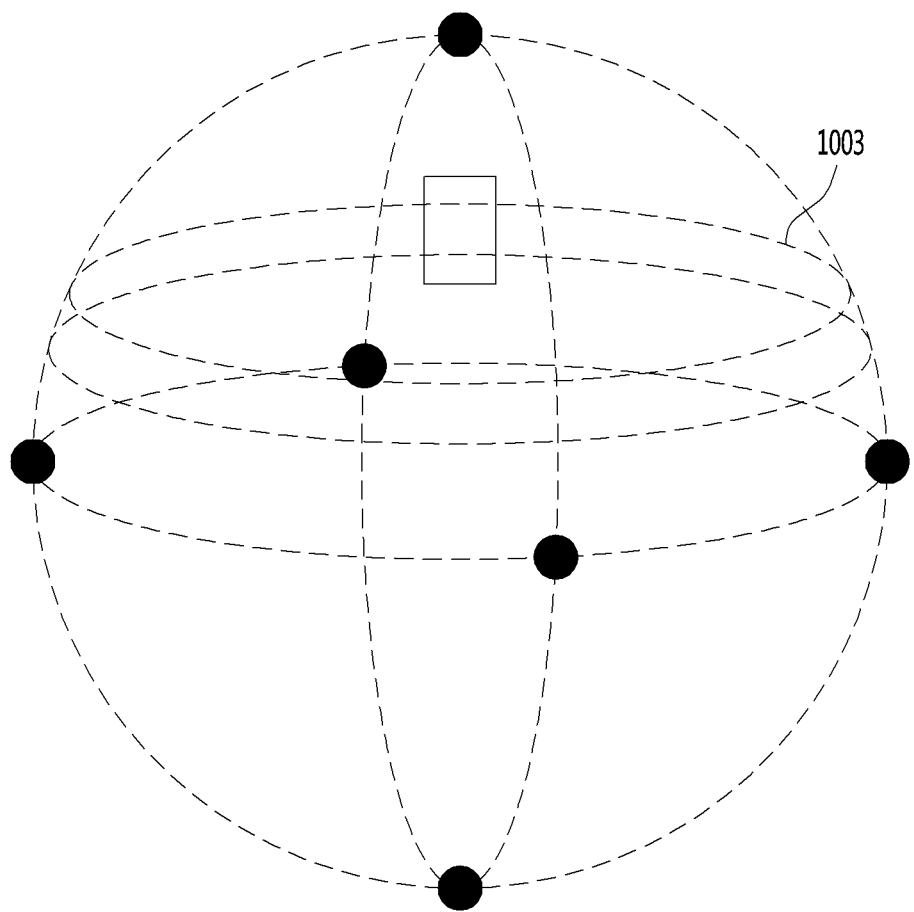

Referring to FIG. 10B, the user of the mobile terminal 100 can move the display area along a band 1003 displayed in the omnidirectional image while fixing the size of the display area of the omnidirectional image to correspond to the height of the band 1003 displayed in the omnidirectional image.

Figure 10C:
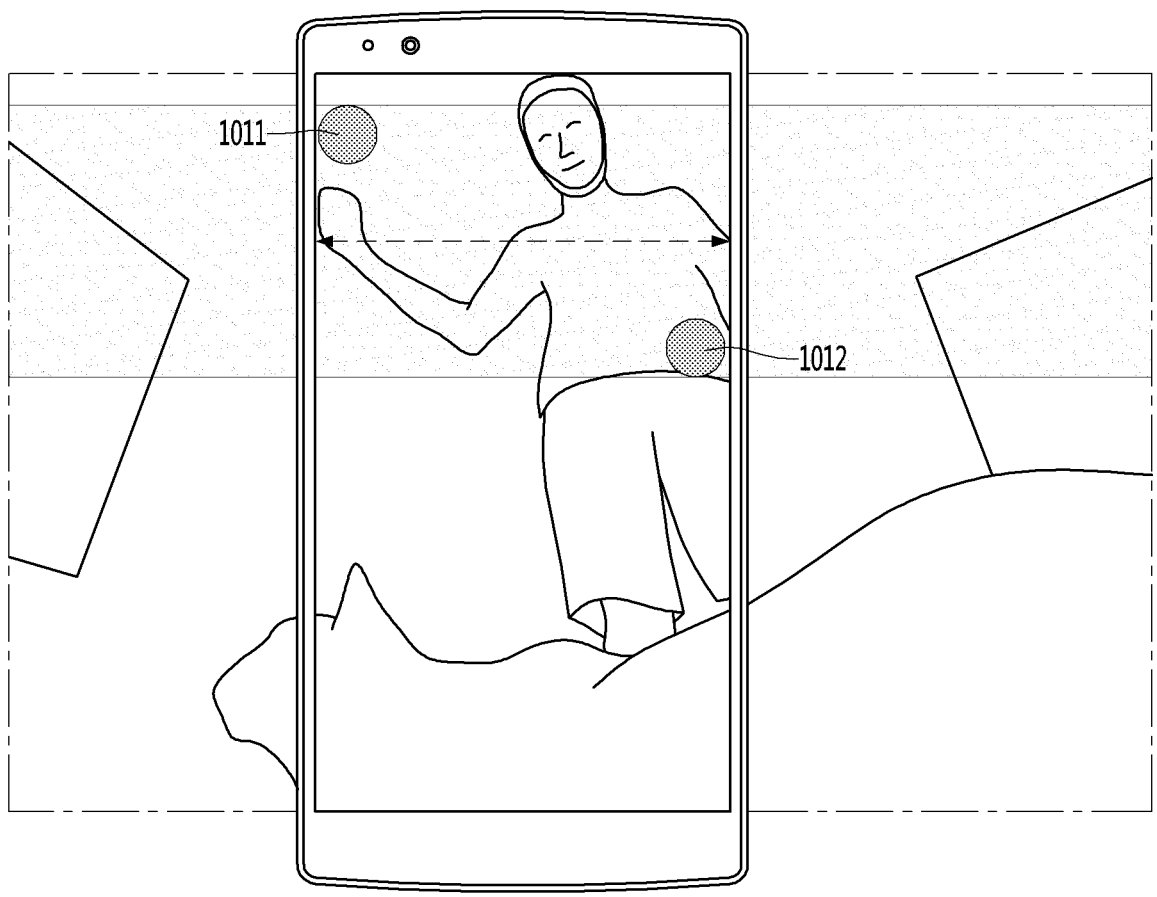

Referring to FIG. 10C, if a gesture for designating an area larger than a previously designated area of the omnidirectional image displayed on the display unit 151 is input after a guideline is set, the controller 180 of the mobile terminal 100 can enlarge the designated area to be displayed on the entire display unit 151, and allow the display area of the omnidirectional image to be moved along the guideline, based on the enlarged screen.

For example, a gesture for selecting a third point 1011 and a fourth point 1012 can be input as shown in FIG. 10C. The gesture can include various gestures such as a force touch, a long touch, and a double touch. When the gesture for selecting the third point 1011 and the fourth point 1012 is input, and the distance between the third point 1011 and the fourth point 1012 does not exceed 50% of the partial area of the omnidirectional image, the controller 180 can enlarge the omnidirectional image such that the selected area is displayed on the entire screen of the display unit 151.

Figure 10D:
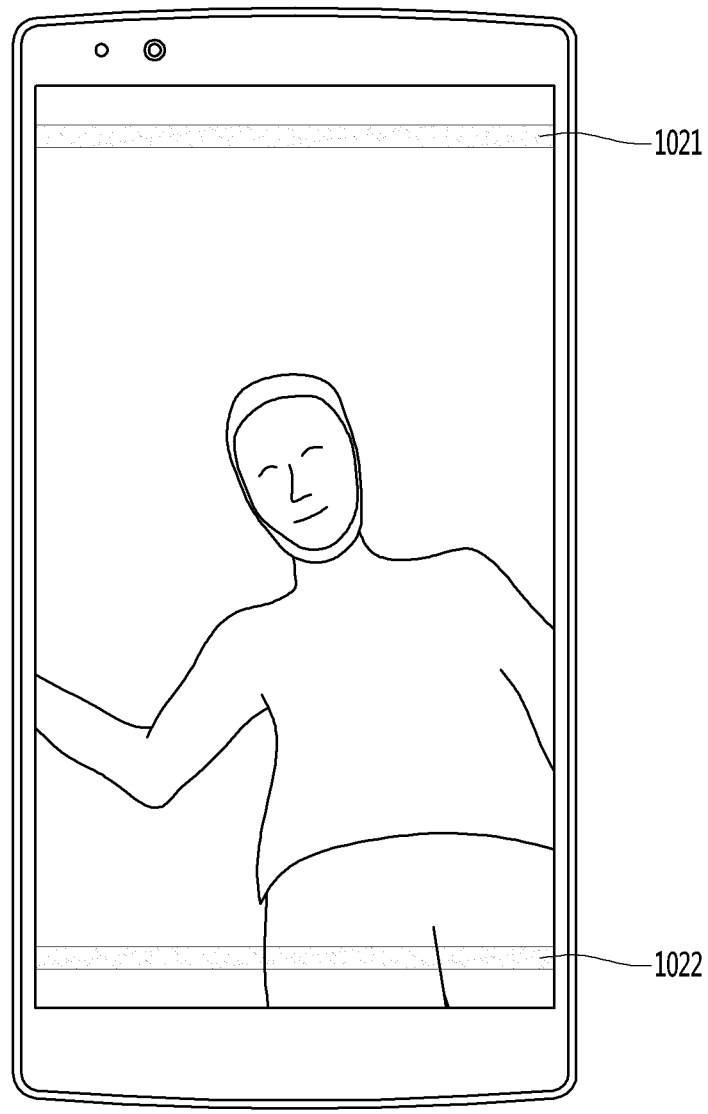

The enlarged image can be displayed as shown in FIG. 10D. The size of the enlarged image can be fixed or be varied. When the size of the enlarged omnidirectional image is fixed, the controller 180 can display, on the display unit 151, indication lines 1021 and 1022 notifying that the size of the omnidirectional image has been fixed.

As the size of the displayed omnidirectional image is fixed, the user can more easily change the display area of the omnidirectional image without any problem that the size of the omnidirectional image is changed due to a malfunction. In addition, as the omnidirectional image is enlarged based on the guideline, the omnidirectional image can be more easily controlled.

In addition, FIGS. 11A to 11F are views illustrating an example of setting a guideline in an omnidirectional image and moving a display area of the omnidirectional image using the set guideline according to another embodiment of the present disclosure. The omnidirectional image can be a still image or a moving image.

Further, when the omnidirectional image is a moving image, the controller 180 of the mobile terminal 100 can change the guideline as time elapses. For example, if it assumed that the reproduction time of the omnidirectional image is two minutes, a guideline from the beginning to one minute of the reproduction time and a guideline from the one minute to two minutes can be set different from each other.

The guideline can become a reference for controlling the movement of the display area of the omnidirectional image even in a state in which the omnidirectional image is stopped. Also, the guideline can become a reference for controlling the movement of the display area while the omnidirectional image is being reproduced.

Figure 11A:
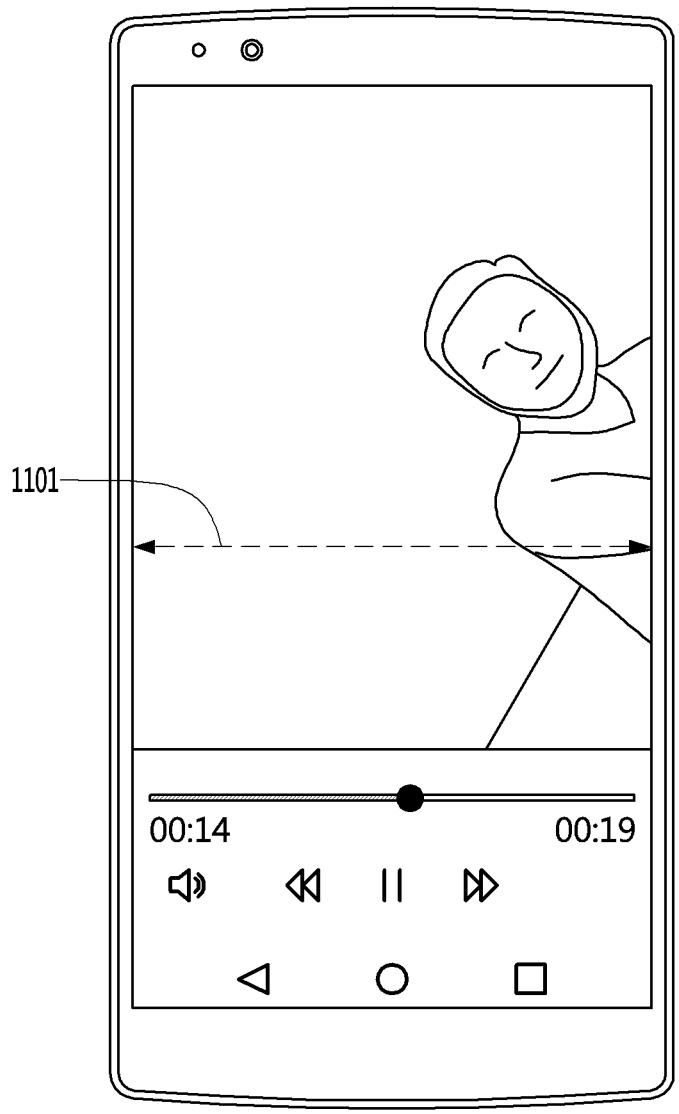
FIGS. 11A to 11F are views illustrating an example of setting a guideline in an omnidirectional image and moving a display area of the omnidirectional image using the set guideline according to another embodiment of the present disclosure.

Referring to FIG. 11A, the omnidirectional image in the form of a moving image can include a guideline 1101. If the omnidirectional image in the form of the moving image is reproduced, the guideline 1101 can be displayed on the display unit 151. The controller 180 can move the display area while the omnidirectional image is being reproduced in a direction corresponding to the displayed guideline 1101.

Figure 11B:
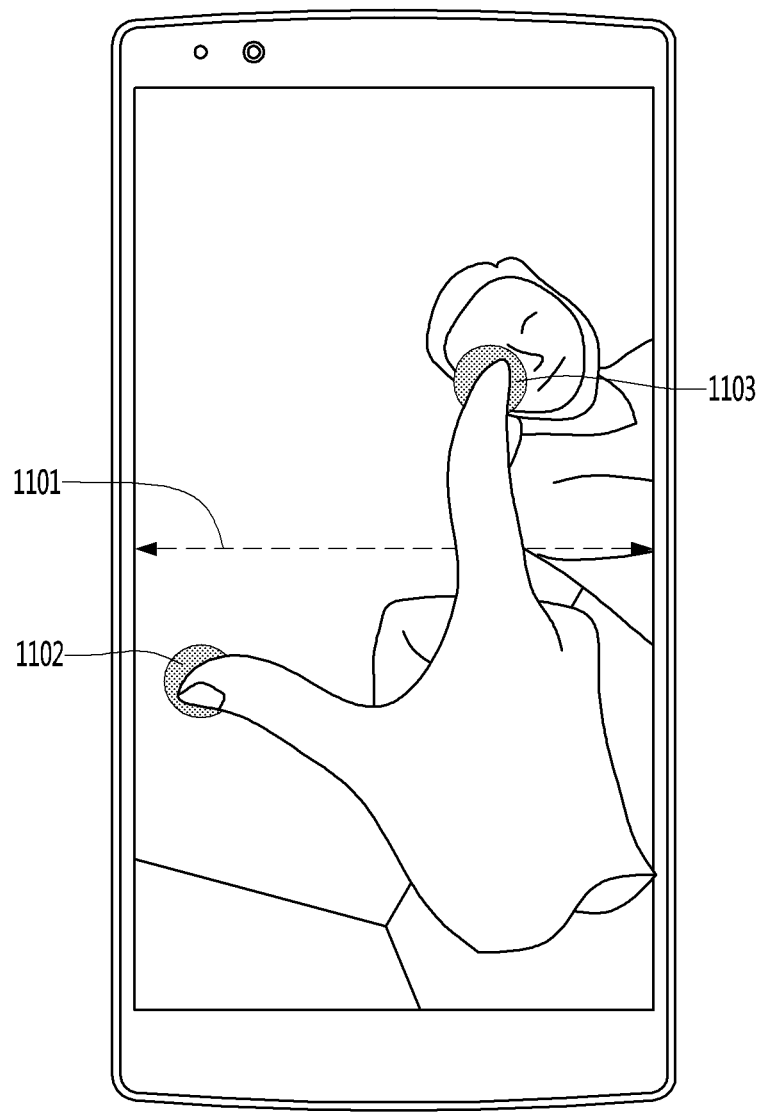

Referring to FIG. 11B, a guideline can be changed or added in a specific display area of the omnidirectional image. For example, if gestures 1102 and 1103 for setting a guideline having a direction different from that of the guideline 1101 are input in the state in which the guideline 1101 is set, the controller 180 can change the guideline or add a guideline.

Figure 11C:
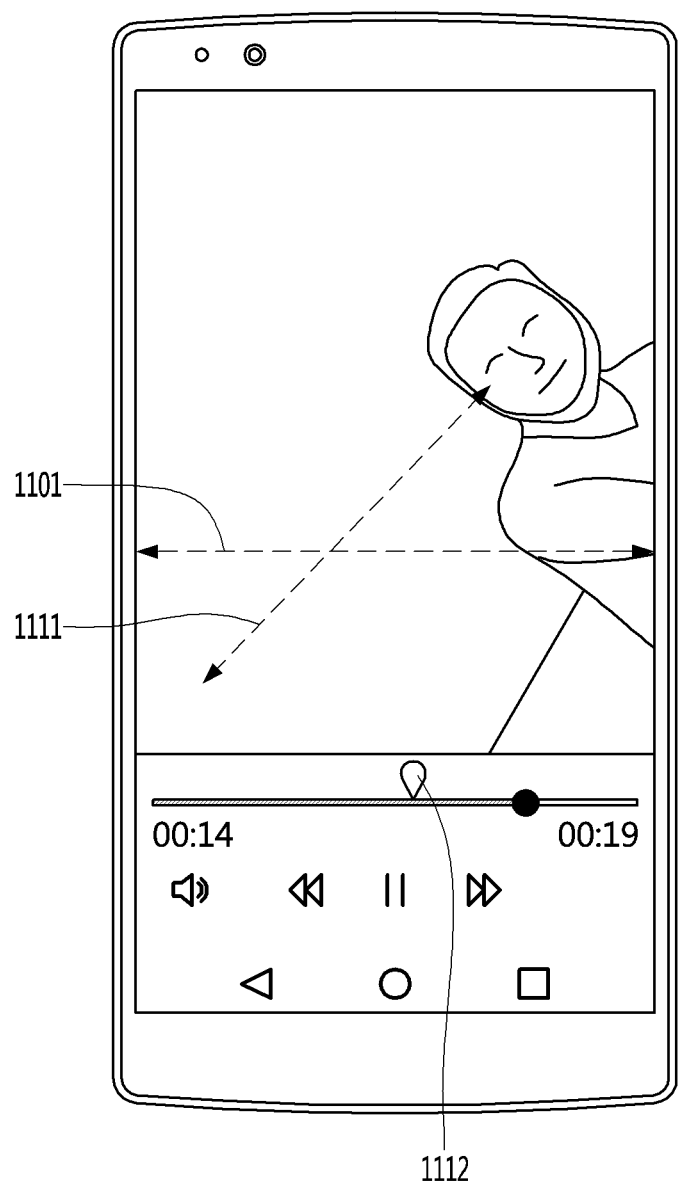

Referring to FIG. 11C, if the gestures 1102 and 1103 for setting the guideline are input, the controller 180 can set a new guideline 1111. However, if the new guideline 1111 is set, the controller 180 can remove the existing guideline 1101. Alternatively, if the new guideline 1111 is set, the controller 180 can allow a plurality of guidelines to be set by maintaining the existing guideline 1101.

When the plurality of guidelines are set, if a scroll gesture is input to the display unit 151, the controller 180 can move the display area of the omnidirectional image to correspond to a guideline adjacent to the input scroll gesture. For example, when the guideline 1101 and the guideline 1111 are set, if a scroll gesture is input to the display unit 151, the controller 180 can select a guideline adjacent to the input scroll gesture out of the guideline 1101 and the guideline 1111 and move the display area of the omnidirectional image in a direction corresponding to the selected guideline.

In addition, only when a scroll gesture is input at a certain distance from each of the plurality of guidelines, the controller 180 can move the display area of the omnidirectional image to corresponding to the guideline. Further, the controller 180 can display a display area in which a guideline is changed or overlaps with another one, using a guideline state change mark 1112 in a reproduction state display area of the omnidirectional image. The guideline state change mark 1112 is a mark that notifies that the state of a guideline in the omnidirectional image has changed, and accordingly, the user of the mobile terminal 100 can more easily detect a state of the omnidirectional image.

Unlike as shown in the drawing, a guideline can be displayed in the reproduction state display area. For example, a range of time can be displayed, and the existence of a guideline can be displayed using a text. That is, the present disclosure is characterized in that a state of a guideline is displayed in the mobile terminal 100. Therefore, the method for displaying the state of the guideline is not limited to the above-described method.

Figure 11D:
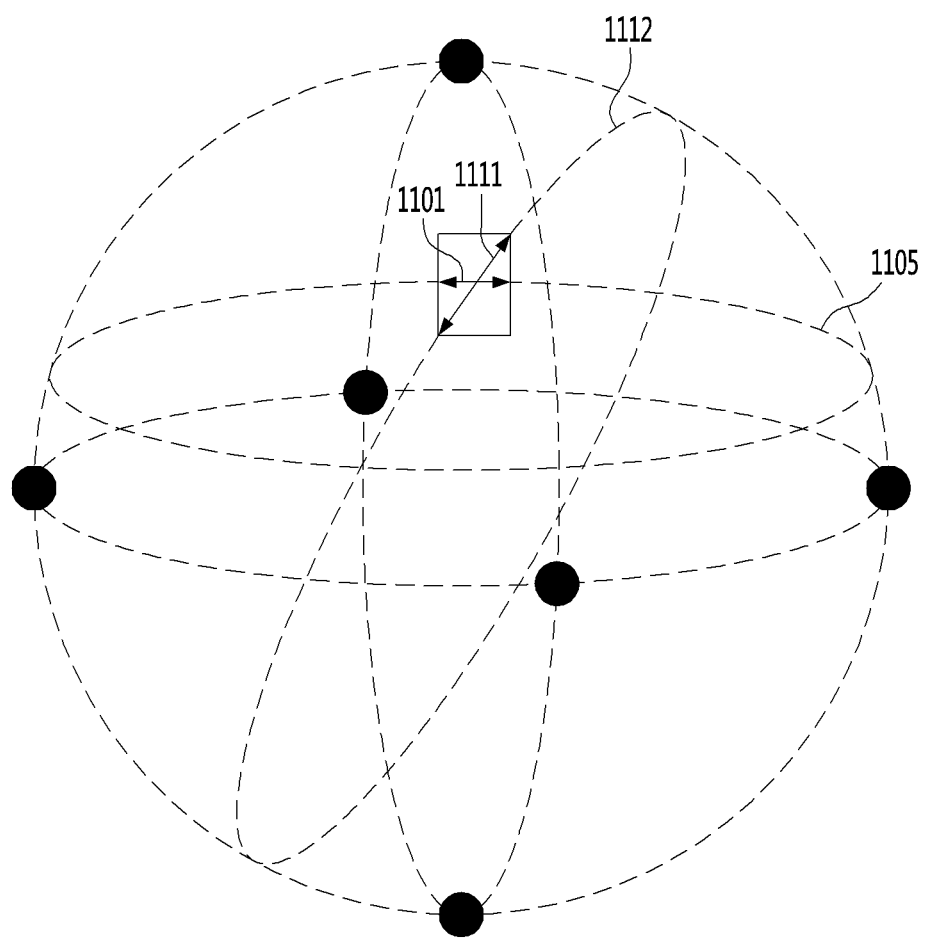

Referring to FIG. 11D, the display area displayed in FIG. 11C is a portion of the omnidirectional image, and a portion of the guideline 1101 is merely displayed in the display area. The guideline 1101 can be a portion of a line 1102 set in the entire omnidirectional area. Therefore, the user can move the display area along the line 1105 set in the entire omnidirectional area. In addition, a portion of the new guideline 111 is merely displayed in the display area, and the new guideline 1111 can be a portion of a line 1112 set in the entire omnidirectional area. Therefore, the user can move the display area along the line 1112 set in the entire omnidirectional area.

Figure 11E:
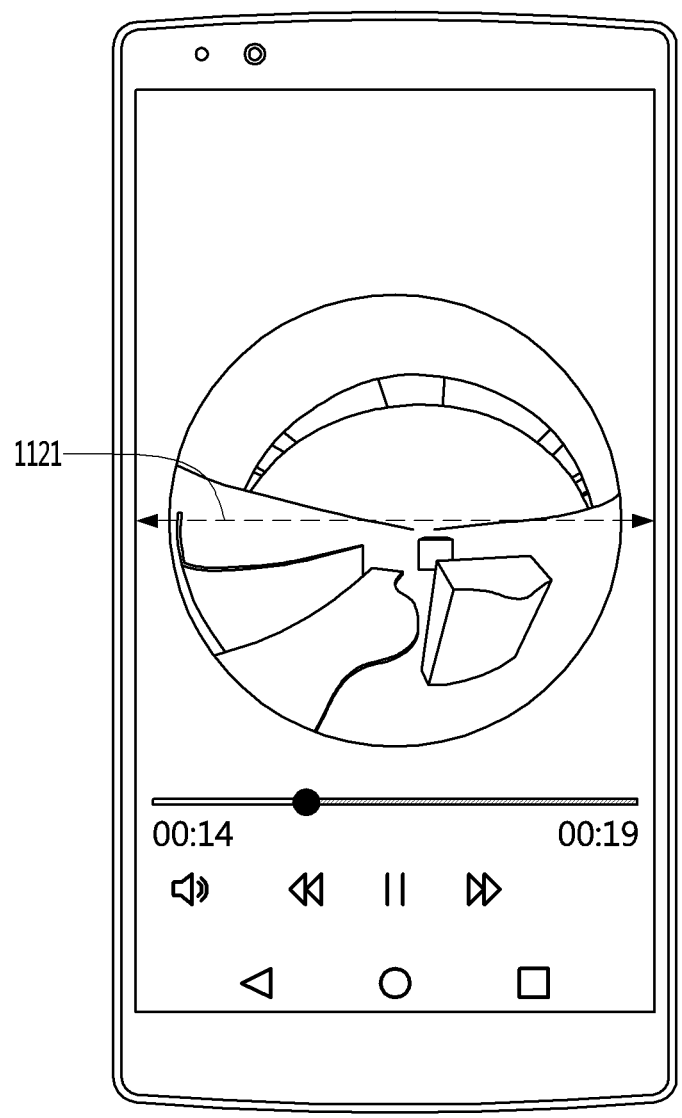
Figure 11F:
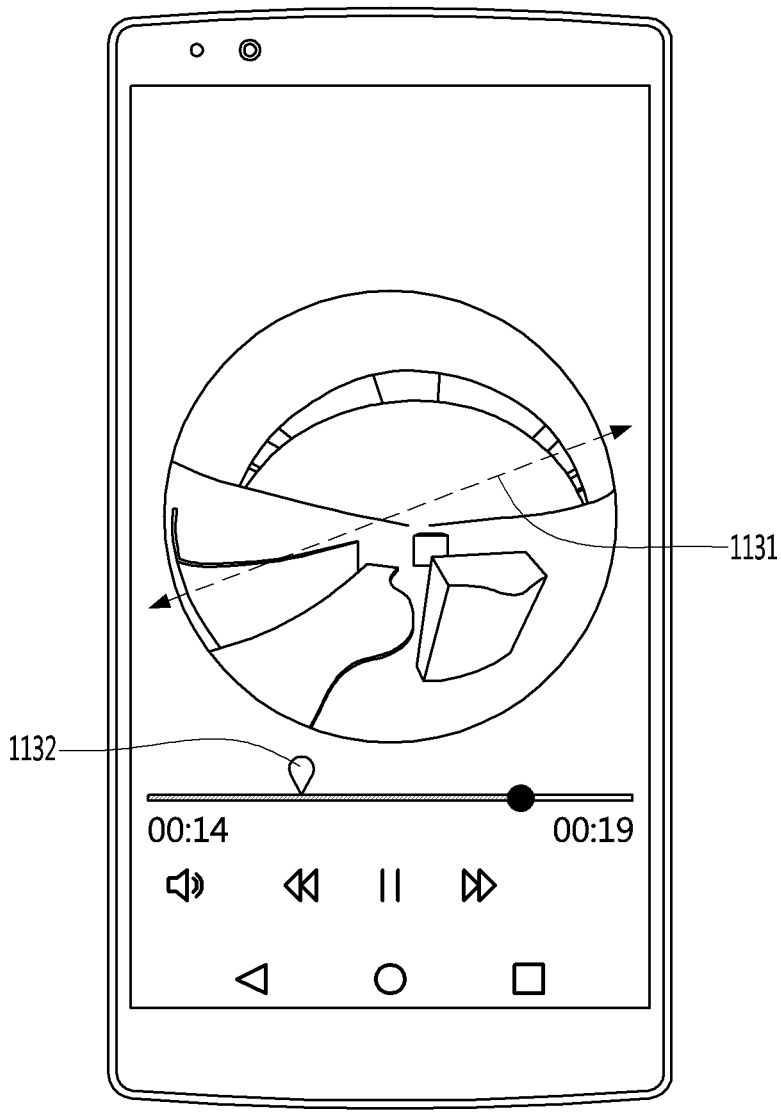

Referring to FIGS. 11E and 11F, a guideline 1121 can be displayed on the display unit 151 even when the omnidirectional image is displayed in a spherical shape. In addition, when the omnidirectional image is displayed in the spherical shape, if a gesture for setting a guideline is input, the controller 180 can set the new guideline 1121.

In addition, when the omnidirectional image is displayed in the spherical shape, the controller 180 can display a display area in which a guideline is changed or overlaps with another one, using a guideline state change mark 1132 in a reproduction state display area of the omnidirectional image. When the omnidirectional image is displayed in the spherical shape, if the guideline is changed, a new guideline 1131 can be displayed.

FIGS. 12A to 12D are views illustrating an example of removing a guideline set in an omnidirectional image according to an embodiment of the present disclosure. Referring to FIGS. 12A to 12D, if a guideline removal gesture of the user is input in a state in which a guideline is set, the controller 180 of the mobile terminal 100 can remove the set guideline.

Figure 12A:
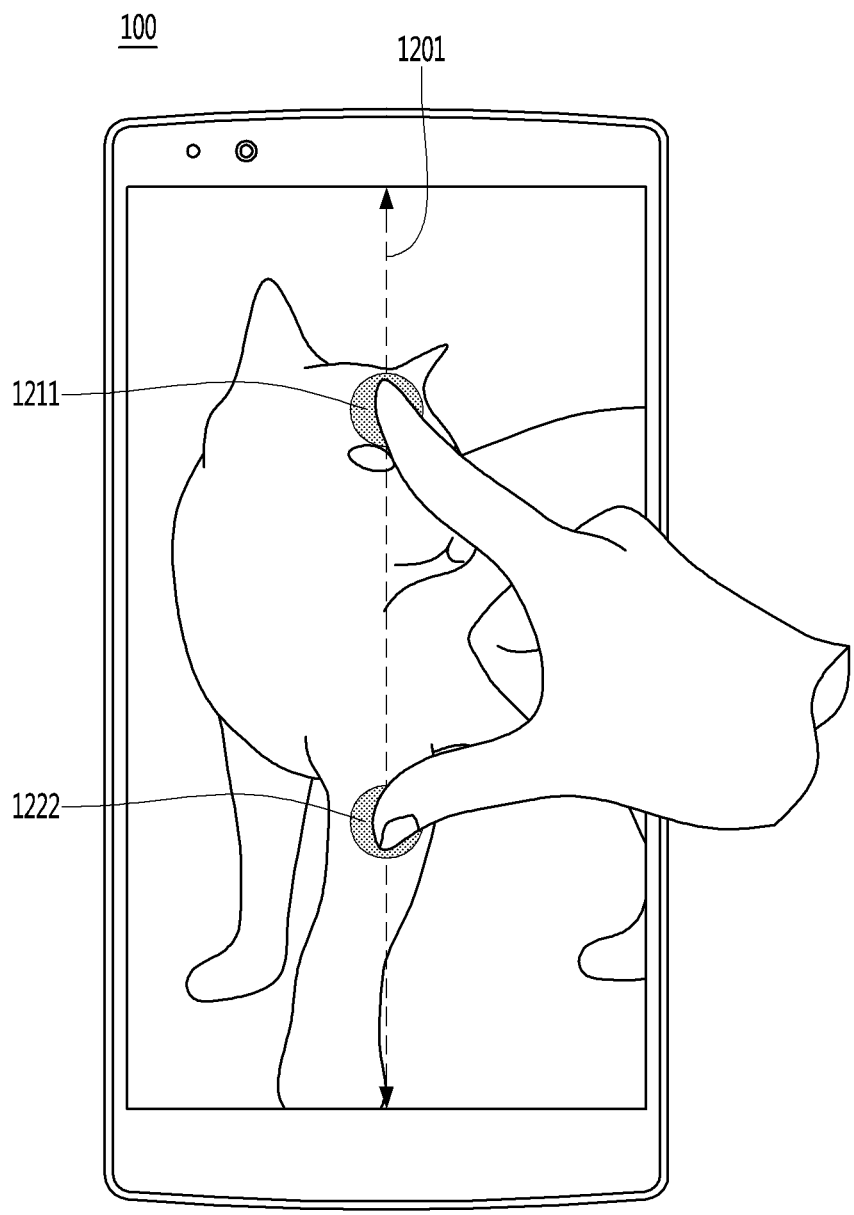
FIGS. 12A to 12D are views illustrating an example of removing a guideline set in an omnidirectional image according to an embodiment of the present disclosure.
Figure 12B:
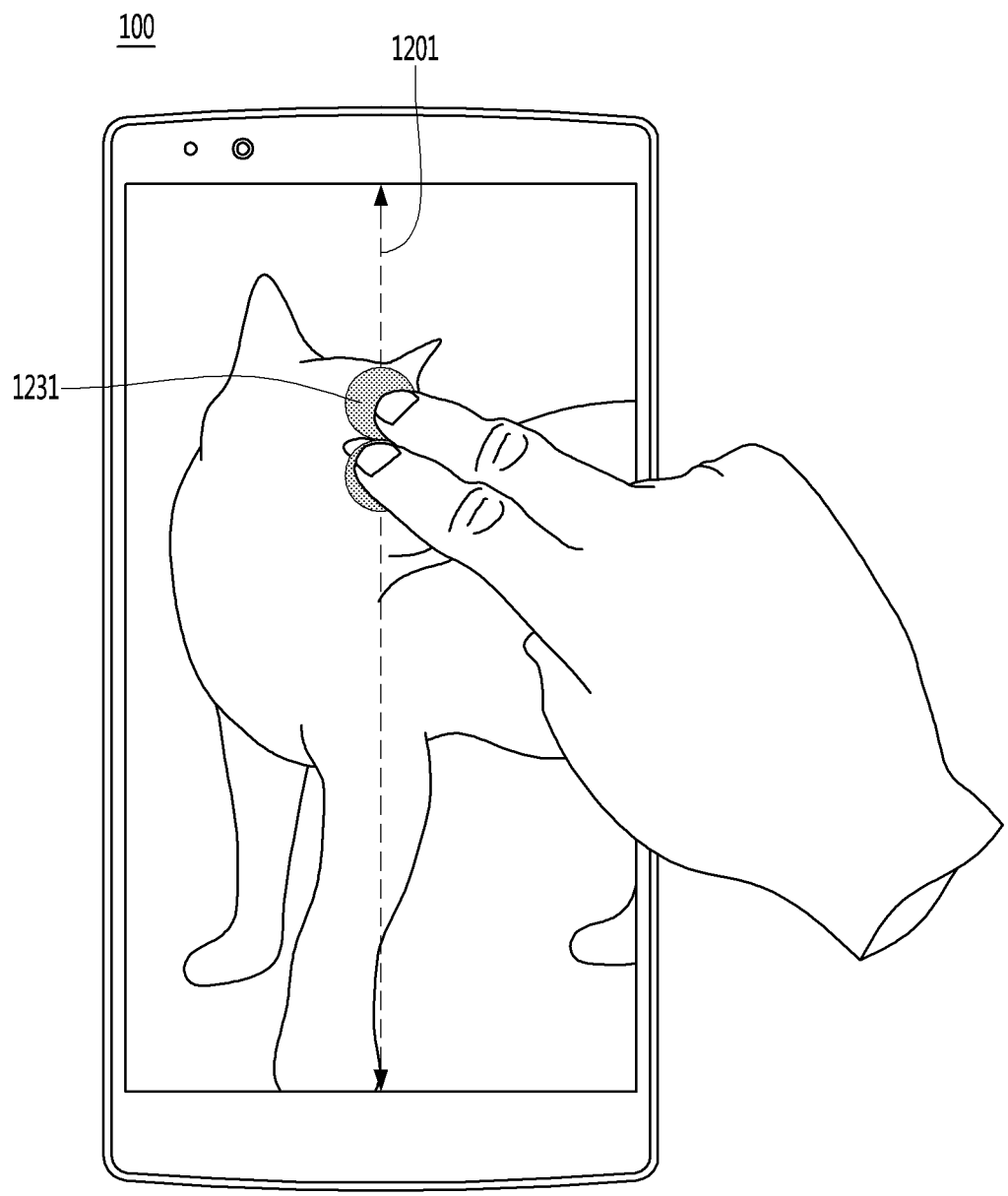

Referring to FIG. 12A, if a multi-touch gesture is input at a first position 1211 and a second position 1222 on a preset guideline 1201, the controller 180 can remove the preset guideline 1201. Referring to FIG. 12B, if a multi-touch gesture is input at a third position 1231 on the preset guideline 1201, and a gesture moving in a direction of the guideline 1201 is input, the controller 180 can remove the preset guideline 1201.

Figure 12C:
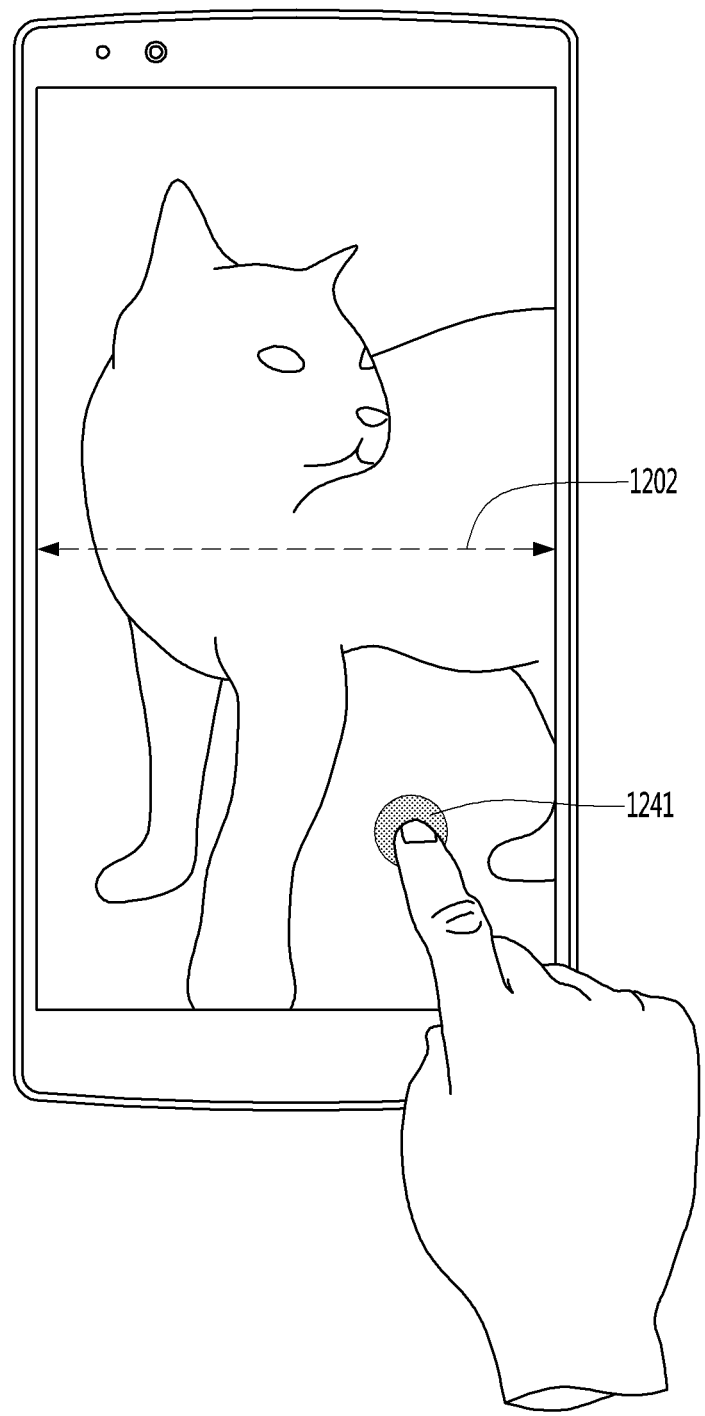
Figure 12D:
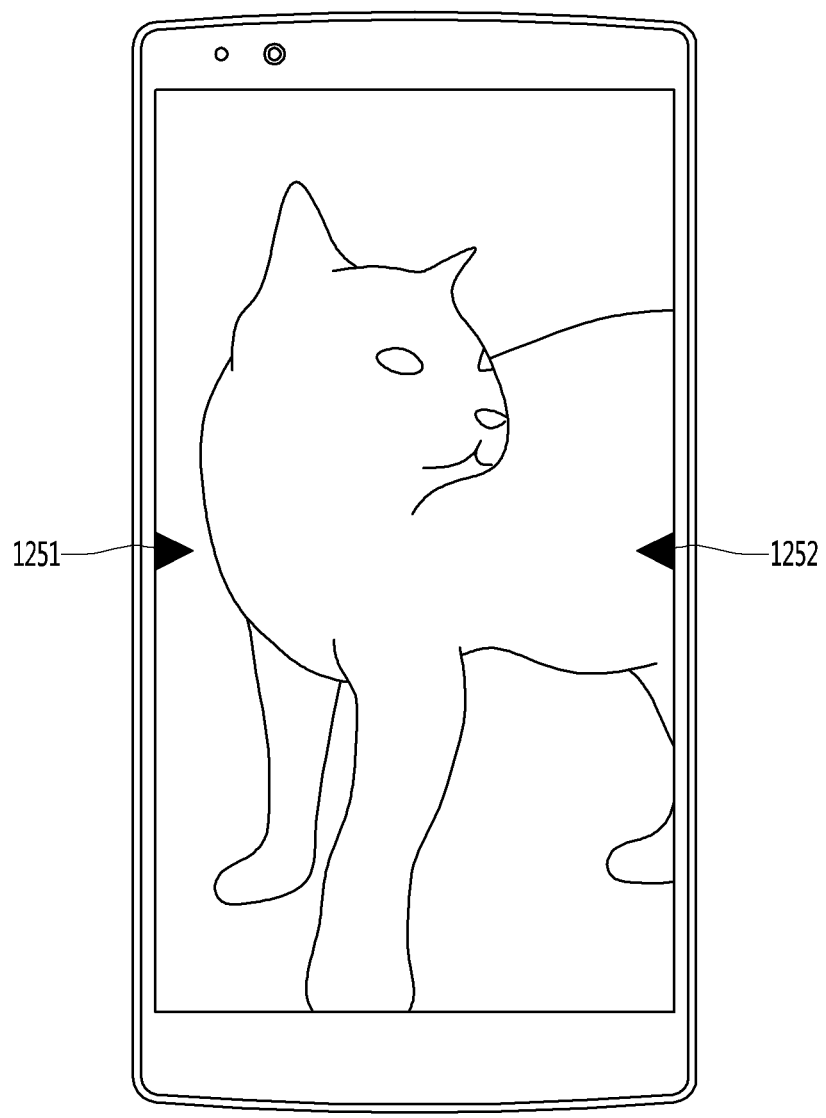

Referring to FIGS. 12C and 12D, if a gesture 1241 is input to another area except a guideline 1202 in a state in which the guideline 1202 is set, the controller 180 can allow the guideline not to be seen on the display unit 151 of the mobile terminal 100. That is, when the gesture 1241 is input, the controller 180 can allow the guideline 1201 not to be displayed on the display unit 151 while maintaining a state in which the guideline 1202 is set as it is. Thus, the user of the mobile terminal 100 can control the display area of the omnidirectional image in a direction of the guideline 1202, and simultaneously remove the guideline 1202 on the display unit 151, thereby obtaining a clearer image.

However, when the guideline 1202 is not seen on the display unit 151, the user cannot know a direction in which the display area of the omnidirectional image is moved. Therefore, when the guideline 1202 is removed, a plurality of guide indicators 1251 and 1252 can be displayed on the display unit 151. The guide indicators 1251 and 1252 can be marks displayed at points at which the guideline 1202 meets an edge of the display unit 151. The guide indicators 1251 and 1252 can be displayed as a plurality of marks. When the guide indicators 1251 and 1252 are connected to each other, a straight line corresponding to the guideline 1202 can be obtained.

In addition, when a gesture for removing the preset guideline 1201 is input in FIGS. 12A and 12B, the controller 180 does not remove the guideline 1201 but can control the guideline 1201 not to be seen on the display unit 151.

Figure 13A:
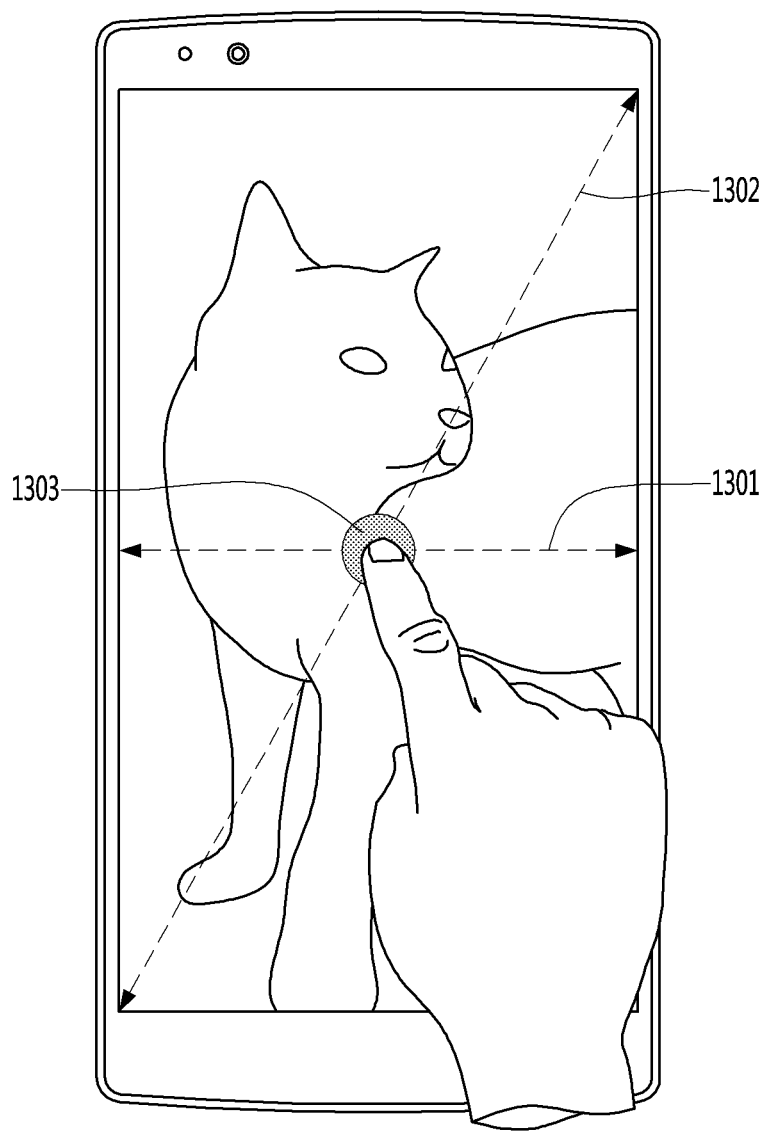
FIGS. 13A to 13C are views illustrating an example of moving and controlling a display area along a plurality of guidelines set in an omnidirectional image according to an embodiment of the present disclosure.
Figure 13B:
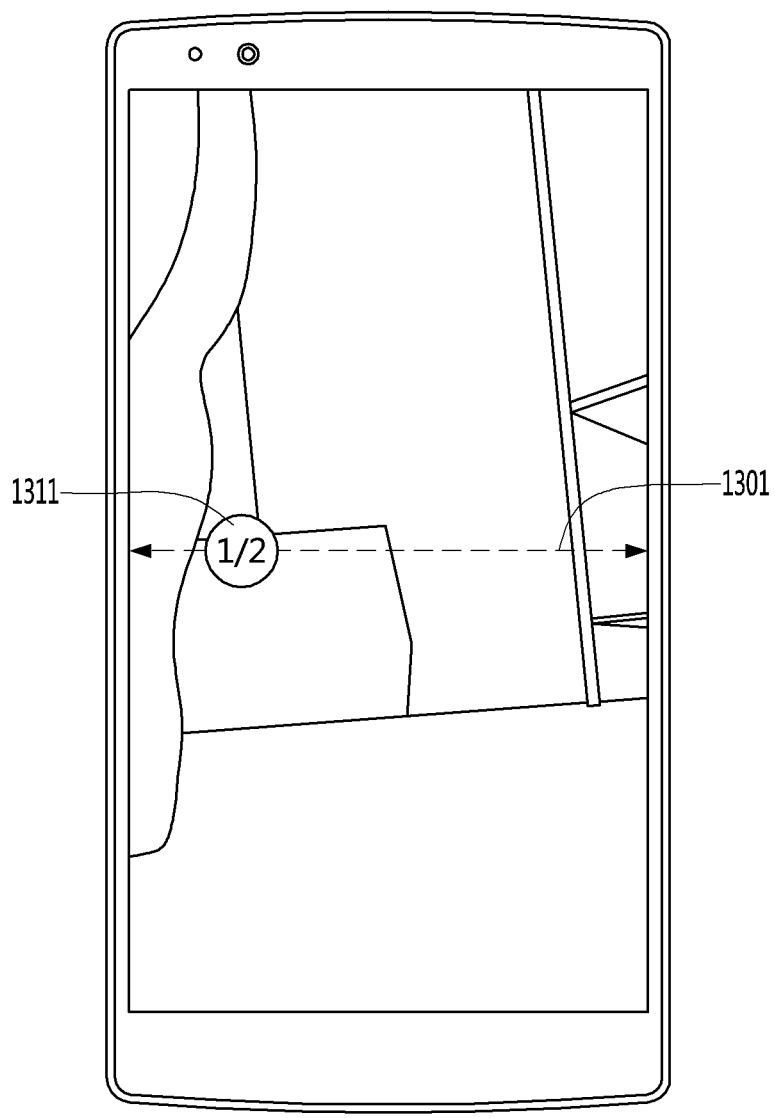
Figure 13C:
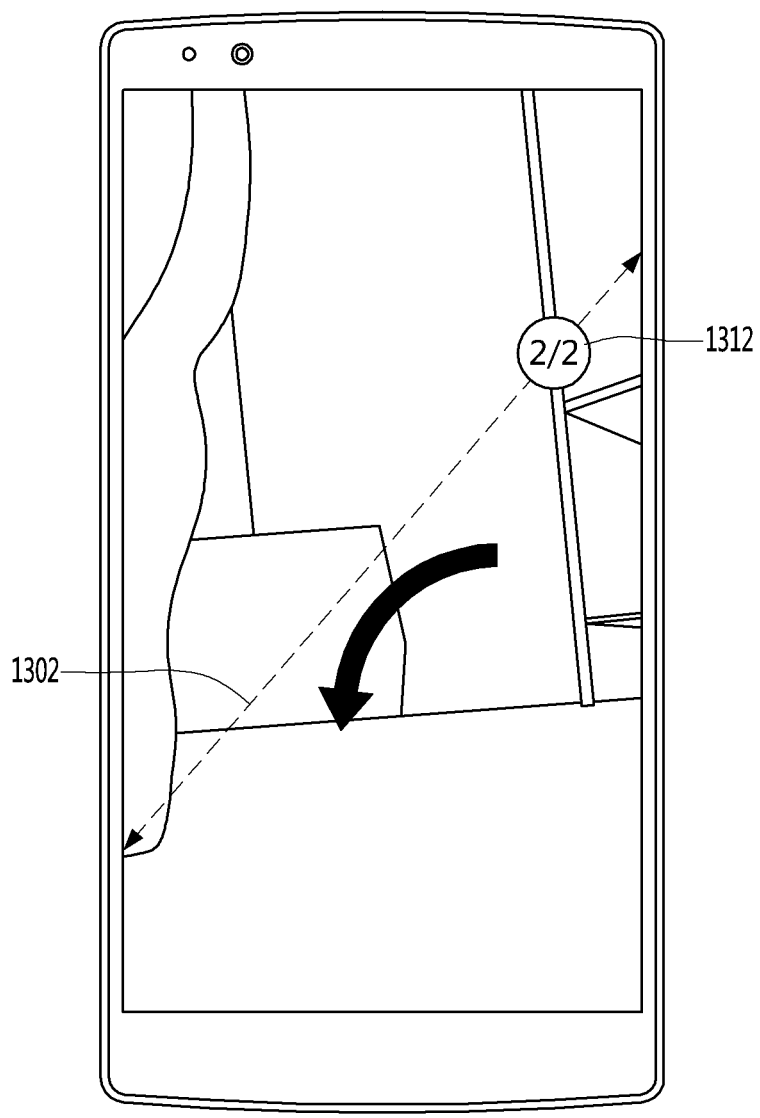

Next, FIGS. 13A to 13C are views illustrating an example of moving and controlling a display area along a plurality of guidelines set in an omnidirectional image according to an embodiment of the present disclosure. Referring to FIGS. 13A to 13C, when a plurality of guidelines 1301 and 1302 are set, the controller 180 of the mobile terminal 100 can designate control orders of the respective guidelines 1301 and 1302.

When the plurality of guidelines 1301 and 1302 are set, the controller 180, if a gesture for designating orders of the respective guidelines 1301 and 1302 is input, the controller 180 of the mobile terminal 100 can enter into an order designation mode of the guidelines 1301 and 1302. For example, when a gesture (e.g., a long press, a force touch, or a double touch) is input to a point 1303 of contact between the plurality of guidelines 1301 and 1302, the controller 180 can enter into a mode for designating orders of the respective guidelines 1301 and 1302.

The controller 180 can receive orders of the respective guidelines 1301 and 1302 in the mode for designating the orders of the respective guidelines 1301 and 1302. For example, when the guideline 1301 is first selected and the guideline 1302 is then selected, the controller 180 can control the display area of the omnidirectional image to be moved along the guideline 1301.

Referring to FIGS. 13B and 13C, the controller 180 can display marks 1311 and 1312 for indicating the orders of the guidelines 1301 and 1302 on the respective guidelines 1301 and 1302. The marks 1311 and 1312 can be indicated as, for example, ½ and ⅔. ½ indicates a guideline firstly controlled when a total number of guidelines is two, and ⅔ indicates a guideline secondly controlled when a total number of guidelines is three. Therefore, the guideline 1301 is represented as a guideline firstly controlled out of the two guidelines as indicated in the mark 1311, and the guideline 1302 is represented as a guideline secondly controlled out of the two guidelines as indicated in the mark 1312.

When the orders of the respective guidelines 1301 and 1302 are designated, the controller 180 can control the display area of the omnidirectional image to be moved along the guideline 1301 of which priority order is higher than that of the guideline 1302. When the display area of the omnidirectional image is moved along the guideline 1301 and then moved to the initial position as the omnidirectional image is rotated once, the controller 180 can remove the guideline 1301. Next, the controller 180 can control the display area of the omnidirectional image to be moved along the guideline 1302 of which priority order is lower than that of the guideline 1301. When the display area of the omnidirectional image is moved along the guideline 1302 and then moved to the initial position as the omnidirectional image is rotated once, the controller 180 can remove the guideline 1302.

In addition, when the display area of the omnidirectional image is rotated once along each of the plurality of guidelines 1301 and 1302, the plurality of guidelines 1301 and 1302 can be returned to their set states, respectively. The number of the plurality of guidelines can be two or more.

Figure 14A:
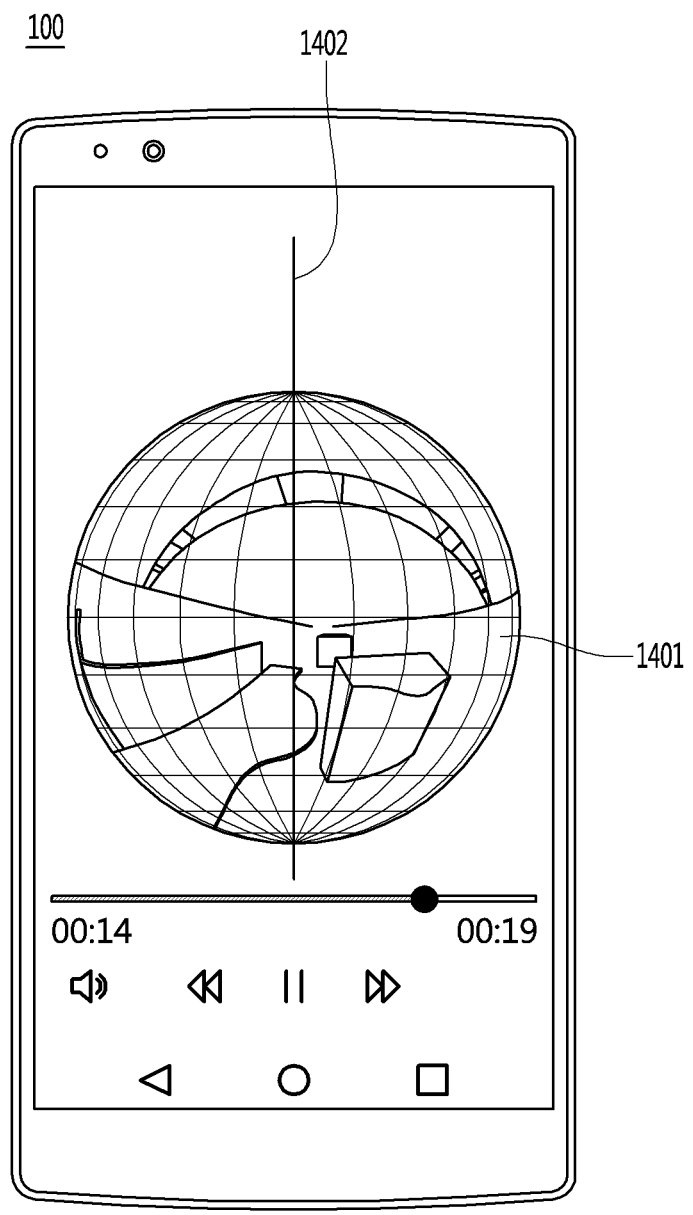
Figure 14C:
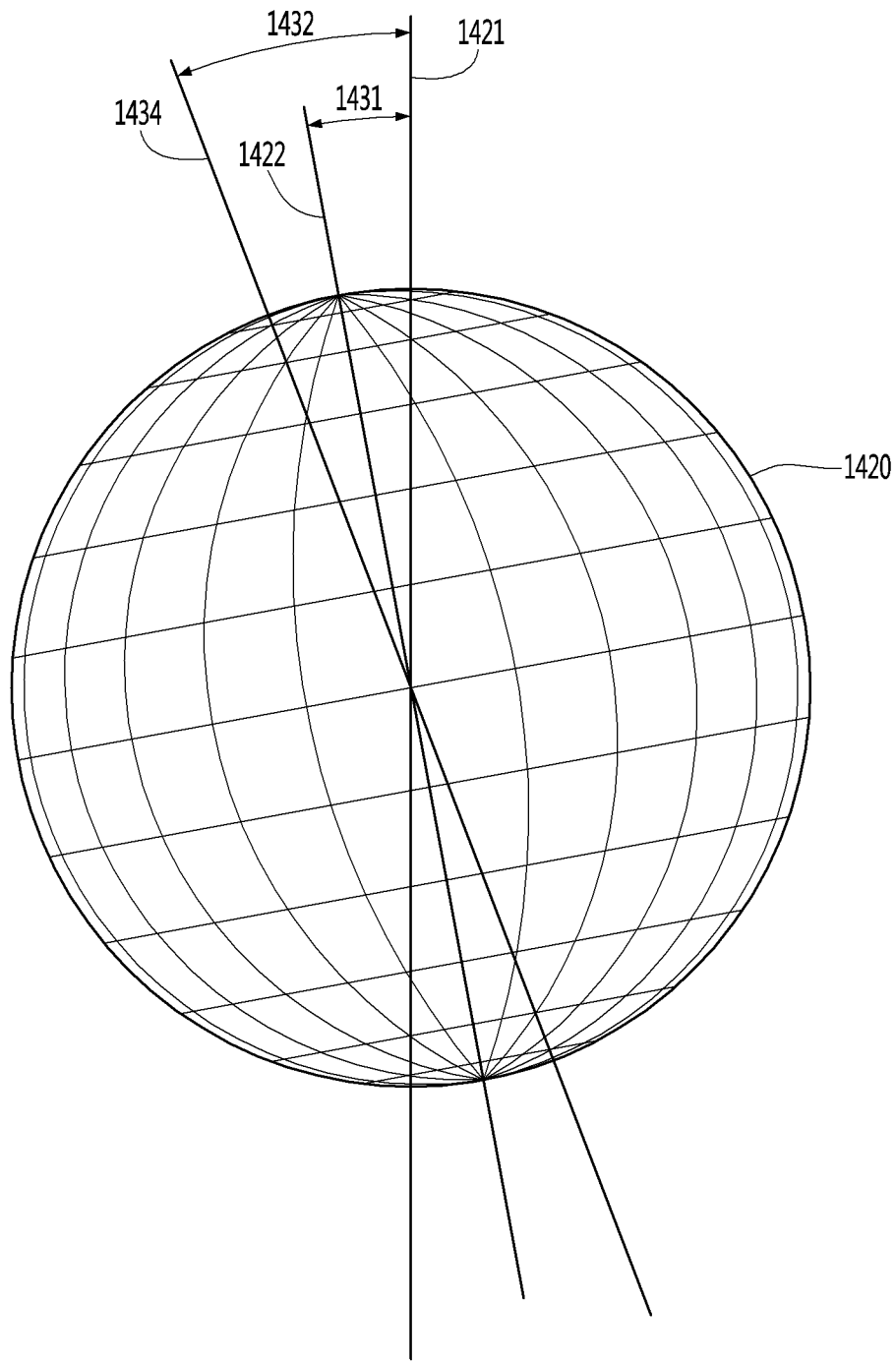

FIGS. 14A to 14C are views illustrating an example of controlling an angle of an omnidirectional image according to an embodiment of the present disclosure. Referring to FIGS. 14A to 14C, when an omnidirectional image is displayed in the shape of a sphere, if a certain gesture is input from the user, the controller 180 can adjust an angle of the sphere for each step.

Referring to FIG. 14A, the controller 180 can display the omnidirectional image in a spherical shape 1401. A reference line 1402 refers to a reference before the angle of a front image having the spherical shape of FIG. 14A is adjusted. When a gesture for inclining the omnidirectional image having the spherical shape 1401 is input from the user, the controller 180 can allow the user to adjust the slope of the omnidirectional image having the spherical shape 1401 in the mobile terminal 100.

For example, when the user inputs a gesture for shaking the mobile terminal 100, the controller 180 can recognize the gesture for shaking the mobile terminal 100 as a gesture for inclining the omnidirectional image. However, the gesture for inclining the omnidirectional image can include various gestures except the gesture for shaking the mobile terminal 100.

If the gesture for inclining the omnidirectional image is input, the controller 180 can change the slope of the omnidirectional image as shown in FIG. 14B. As compared with the existing reference line 1402, a new reference line 1403 can be a reference line rotated by an angle 1405 corresponding to the gesture for shaking the mobile terminal 100.

Referring to FIG. 14C, the controller 180 of the mobile terminal 100 can change the angle by which the new reference line 1403 is rotated by recognizing a magnitude of the gesture for shaking the mobile terminal 100. For example, when the magnitude of the gesture for shaking the mobile terminal 100 is weak, a new reference line can be a reference line 1422, and the reference line 1422 can be a reference line rotated by an angle 1431. In addition, when the magnitude of the gesture for shaking the mobile terminal 100 is strong, a new reference line 1434 can be a reference line rotated by an angle 1432.

According to various embodiment of the present disclosure, the mobile terminal enables a user to view a desired image by scrolling an omnidirectional image in a direction desired by the user while the user is viewing the omnidirectional image through the mobile terminal. Further, the mobile terminal that enables a user to conveniently generate control, or remove a guideline for moving an omnidirectional image in a desired direction while the user is viewing the omnidirectional image through the mobile terminal. In addition, the controller 180 is generally a component that manages the control of the apparatus and can also be referred to as a central processing unit, a microprocessor, a processor, and the like.

The present disclosure mentioned in the foregoing description can be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein can be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a touch screen; and
a controller configured to:
display an area of an omnidirectional image on the touch screen,
display a guideline on the touch screen for guiding a movement of the omnidirectional image,
in response to a scrolling gesture on the touch screen having a first direction corresponding to a direction of the guideline, move the display area of the omnidirectional image in the first direction,
in response to the scrolling gesture on the touch screen having a second direction different than the direction of the guideline, move the display area of the omnidirectional image along the guideline in the first direction instead of the second direction, and
set a first guideline based on a first gesture selecting a first point and a second point and move the display area of the omnidirectional image along the first guideline in a third direction corresponding to the first guideline based on a second gesture in a fourth direction different than the third direction.

2. The mobile terminal of claim 1, wherein the guideline includes a plurality of guidelines, and
wherein the controller is further configured to move the display area of the omnidirectional image to correspond to a direction of a guideline adjacent to the scrolling gesture among the plurality of guidelines.

3. The mobile terminal of claim 1, wherein the controller is further configured to display the guideline corresponding to at least one of vertical and horizontal directions of the touch screen, according to a preset input.

4. The mobile terminal of claim 1, further comprising:
a microphone,
wherein the controller is further configured to detect a position of the sound received by the microphone, and display the guideline corresponding to the detected position.

5. The mobile terminal of claim 1, wherein in response to the scrolling gesture having the second direction, the controller is further configured to move the display area at a speed set according to an angle between the second direction of the scrolling gesture and the direction of the guideline.

6. The mobile terminal of claim 1, wherein the controller is further configured to:
in response to a gesture selecting a third point and a fourth point and an area set by the gesture being smaller than a preset reference area, enlarge and display the area set by the gesture.

7. The mobile terminal of claim 1, wherein in response to a gesture selecting a third point and a fourth point, the controller is further configured to display an additional guideline corresponding to the third point and the fourth point of the gesture.

8. The mobile terminal of claim 7, wherein the controller is further configured to stop displaying the guideline when the additional guideline is displayed.

9. The mobile terminal of claim 1, wherein the guideline is a portion of a line set in the entire omnidirectional image.

10. The mobile terminal of claim 1, wherein a moving speed of the display area of the omnidirectional image is reduced when the scrolling gesture has a directional angle different than that of the guideline.

11. The mobile terminal of claim 1, wherein in response to the scrolling gesture on the touch screen having the second direction, the controller is further configured to move the display area of the omnidirectional image an amount corresponding to a magnitude of the scrolling gesture.

12. A method of controlling a mobile terminal, the method comprising:
- displaying an area of an omnidirectional image on a touch screen of the mobile terminal;
- displaying a guideline on the touch screen for guiding a movement of the omnidirectional image,
- in response to a scrolling gesture on the touch screen having a first direction corresponding to a direction of the guideline, moving, via a controller of the mobile terminal, the display area of the omnidirectional image in the first direction;
- in response to the scrolling gesture on the touch screen having a second direction different than the direction of the guideline, moving, via the controller, the display area of the omnidirectional image along the guideline in the first direction instead of the second direction; and
- setting a first guideline based on a first gesture selecting a first point and a second point and moving the display area of the omnidirectional image along the first guideline in a third direction corresponding to the first guideline based on a second gesture in a fourth direction different than the third direction.

13. The method of claim 12, wherein the first guideline is a straight line including the first point and the second point.

14. The method of claim 12, wherein the guideline includes a plurality of guidelines, and
wherein the method further comprises moving the display area of the omnidirectional image to correspond to a direction of a guideline adjacent to the scrolling gesture among the plurality of guidelines.

15. The method of claim 12, further comprising:
displaying the guideline corresponding to at least one of vertical and horizontal directions of the touch screen, according to a preset input.

16. The method of claim 12, further comprising:
detecting a position of a received sound from a microphone included in the mobile terminal; and
displaying the guideline corresponding to the detected position.

17. The method of claim 12, wherein in response to the scrolling gesture having the second direction, the method further comprises moving the display area at a speed set according to an angle between the second direction of the scrolling gesture and the direction of the guideline.

* * * * *